United States Patent
Fiolka

(10) Patent No.: US 10,876,970 B2
(45) Date of Patent: Dec. 29, 2020

(54) LIGHT-SHEET MICROSCOPE WITH PARALLELIZED 3D IMAGE ACQUISITION

(71) Applicant: The Board of Regents of the University Of Texas System, Austin, TX (US)

(72) Inventor: Reto P Fiolka, Dallas, TX (US)

(73) Assignee: The Board of Regents of the University of Texas System, Austin, TX (US)

(*) Notice: Subject to any disclaimer, the term of this patent is extended or adjusted under 35 U.S.C. 154(b) by 0 days.

(21) Appl. No.: 16/093,561

(22) PCT Filed: Apr. 12, 2017

(86) PCT No.: PCT/US2017/027093
§ 371 (c)(1),
(2) Date: Oct. 12, 2018

(87) PCT Pub. No.: WO2017/180680
PCT Pub. Date: Oct. 19, 2017

(65) Prior Publication Data
US 2019/0170646 A1   Jun. 6, 2019

Related U.S. Application Data

(60) Provisional application No. 62/321,496, filed on Apr. 12, 2016.

(51) Int. Cl.
*G02B 21/00* (2006.01)
*G01N 21/64* (2006.01)
(Continued)

(52) U.S. Cl.
CPC ....... *G01N 21/6458* (2013.01); *G02B 21/008* (2013.01); *G02B 21/0032* (2013.01);
(Continued)

(58) Field of Classification Search
CPC ....... G01N 2021/6463; G01N 21/6458; G01N 2201/061; G01N 2021/655;
(Continued)

(56) References Cited

U.S. PATENT DOCUMENTS

| 5,479,252 A | 12/1995 | Worster et al. |
| 6,098,031 A | 8/2000 | Svetkoff et al. |

(Continued)

FOREIGN PATENT DOCUMENTS

| CN | 101893755 | 11/2010 |
| CN | 102122063 | 7/2011 |

(Continued)

OTHER PUBLICATIONS

Abrahamsson et al., "Fast multicolor 3D imaging using aberration-corrected multifocus microscopy," *Nature Methods*, 2013, 10(1):60-63.

(Continued)

*Primary Examiner* — Irakli Kiknadze
(74) *Attorney, Agent, or Firm* — Polsinelli PC; Adam C. Rehm

(57) ABSTRACT

This disclosure includes an imaging system that is configured to image in parallel multiple focal planes in a sample uniquely onto its corresponding detector while simultaneously reducing blur on adjacent image planes. For example, the focal planes can be staggered such that fluorescence detected by a detector for one of the focal planes is not detected, or is detected with significantly reduced intensity, by a detector for another focal plane. This enables the imaging system to increase the volumetric image acquisition rate without requiring a stronger fluorescence signal. Additionally or alternatively, the imaging system may be operated at a slower volumetric image acquisition rate (e.g., that of a conventional microscope) while providing longer expo- (Continued)

sure times with lower excitation power. This may reduce or delay photo-bleaching (e.g., a photochemical alteration of the dye that causes it to no longer be able to fluoresce), thereby extending the useful life of the sample.

18 Claims, 15 Drawing Sheets

(51) Int. Cl.
*G02B 21/36* (2006.01)
*G02B 21/16* (2006.01)
*G02B 27/14* (2006.01)
*G02B 27/10* (2006.01)

(52) U.S. Cl.
CPC ......... *G02B 21/0076* (2013.01); *G02B 21/16* (2013.01); *G02B 21/367* (2013.01); *G01N 2021/6463* (2013.01); *G01N 2201/061* (2013.01); *G02B 27/1066* (2013.01); *G02B 27/144* (2013.01)

(58) Field of Classification Search
CPC ........... G01N 21/6408; G01N 21/6428; G01N 21/6486; G01N 21/3581; G01N 21/39; G01N 21/6463; G01N 2021/212; G01N 2021/6471; G01N 21/211; G01N 21/648; G01N 2201/063; G01N 2201/105; G02B 21/0032; G02B 21/0076; G02B 21/008; G02B 21/16; G02B 21/367; G02B 27/1066; G02B 27/144; G02B 21/002; G02B 21/06; G02B 21/248; G02B 21/26; G02B 21/361; G02B 21/36; G02B 21/0004; G02B 21/0096; G02B 21/365; G02B 27/095; G02B 21/0052; G02B 21/025; G02B 21/08; G02B 21/10; G02B 21/241; G06T 2207/30016; G06T 2207/30024; G06T 7/32; H04N 13/398; H04N 13/189; H04N 13/194; H04N 13/239; H04N 13/286; H04N 13/344; H04N 2013/0081; H04N 13/158; H04N 13/207; H04N 13/221; H04N 13/254; H04N 13/275; H04N 13/296; H04N 13/327; A61B 2017/00057; A61B 5/0059; A61B 5/415; A61B 5/418; A61B 5/4519
USPC .............. 250/495.1; 378/42, 43, 62
See application file for complete search history.

(56) References Cited

U.S. PATENT DOCUMENTS

| | | | |
|---|---|---|---|
| RE38,307 E | | 11/2003 | Gustafsson et al. |
| 6,711,283 B1 | | 3/2004 | Soenkson |
| 6,903,347 B2 | | 6/2005 | Baer |
| 7,297,961 B2 | | 11/2007 | Kang et al. |
| 7,417,227 B2 | | 8/2008 | Matsumoto et al. |
| 7,554,725 B2 | | 6/2009 | Stelzer et al. |
| 7,787,179 B2 | | 8/2010 | Lippert et al. |
| 7,801,352 B2 | | 9/2010 | Uchiyama et al. |
| 8,115,806 B2 | | 2/2012 | Osawa et al. |
| 8,351,120 B2 | | 1/2013 | Deng et al. |
| 8,441,633 B2 | | 5/2013 | Truong et al. |
| 8,514,488 B2 | | 8/2013 | Lucke et al. |
| 8,792,162 B2 | | 7/2014 | Lippert et al. |
| 8,809,810 B2 | | 8/2014 | Liu et al. |
| 8,970,950 B2 | | 3/2015 | Stelzer |
| 8,978,984 B2 | | 3/2015 | Hennick et al. |
| 9,057,879 B2 | | 6/2015 | Knebel et al. |
| 9,110,301 B2 | | 8/2015 | Lippert et al. |
| 9,134,521 B2 | | 9/2015 | Huisken |
| 9,201,011 B2 * | 12/2015 | Kalkbrenner | ...... G01N 21/6447 |
| 9,217,665 B2 | | 12/2015 | Santori et al. |
| 9,305,956 B2 | | 4/2016 | Pitts et al. |
| 9,307,169 B2 | | 4/2016 | Kodama |
| 9,500,849 B2 | | 11/2016 | Cherry et al. |
| 9,645,378 B2 | | 5/2017 | Hilbert et al. |
| 9,658,443 B2 | | 5/2017 | Broxton et al. |
| 9,678,323 B2 | | 6/2017 | Orth et al. |
| 9,697,605 B2 | | 7/2017 | Lippert et al. |
| 9,804,378 B2 | | 10/2017 | Singer et al. |
| 9,810,896 B2 | | 11/2017 | Nishiwaki |
| 9,829,691 B2 | | 11/2017 | Otte et al. |
| 9,864,182 B2 * | 1/2018 | Kleppe | ............... G02B 21/025 |
| 10,018,819 B2 | | 7/2018 | Iguchi et al. |
| 10,042,148 B2 | | 8/2018 | Iguchi |
| 10,048,482 B2 | | 8/2018 | Pretorius |
| 10,067,328 B2 | | 9/2018 | Ouchi |
| 10,095,018 B2 | | 10/2018 | Ouchi |
| 10,114,207 B2 | | 10/2018 | Ishiwata |
| 10,690,898 B2 * | 6/2020 | Atzler | ................... G02B 21/16 |
| 10,739,266 B2 * | 8/2020 | Keller | ................... G01N 21/64 |
| 2002/0001089 A1 | | 1/2002 | Price |
| 2003/0218746 A1 | | 11/2003 | Sampas |
| 2005/0089208 A1 | | 4/2005 | Dong et al. |
| 2005/0092934 A1 | | 5/2005 | Kang et al. |
| 2006/0012872 A1 | | 1/2006 | Hayashi et al. |
| 2006/0033987 A1 | | 2/2006 | Stelzer et al. |
| 2006/0038144 A1 | | 2/2006 | Maddison |
| 2006/0088844 A1 | | 4/2006 | Xu |
| 2006/0197034 A1 | | 9/2006 | Shirai et al. |
| 2006/0274408 A1 | | 12/2006 | Lauer |
| 2007/0035855 A1 | | 2/2007 | Dickensheets |
| 2007/0058246 A1 | | 3/2007 | Westphal et al. |
| 2007/0154938 A1 | | 7/2007 | Oshida et al. |
| 2007/0206097 A1 | | 9/2007 | Uchiyama et al. |
| 2007/0206276 A1 | | 9/2007 | Gugel et al. |
| 2008/0117503 A1 | | 5/2008 | Reimer et al. |
| 2008/0158551 A1 | | 7/2008 | Hess |
| 2008/0185533 A1 | | 8/2008 | Kimura et al. |
| 2009/0237765 A1 | | 9/2009 | Lippert et al. |
| 2009/0242798 A1 | | 10/2009 | Bewersdorf et al. |
| 2010/0111768 A1 | | 5/2010 | Banerjee et al. |
| 2010/0148092 A1 | | 6/2010 | Zheng et al. |
| 2010/0328657 A1 | | 12/2010 | Dholakia et al. |
| 2011/0036996 A1 | | 2/2011 | Weolleschensky et al. |
| 2011/0115895 A1 | | 5/2011 | Huisken |
| 2011/0122488 A1 | | 5/2011 | Truong et al. |
| 2011/0134521 A1 | | 6/2011 | Truong et al. |
| 2012/0026311 A1 | | 2/2012 | Ouchi et al. |
| 2012/0049087 A1 * | 3/2012 | Choi | ..................... G02B 21/367 |
| | | | 250/459.1 |
| 2012/0098949 A1 | | 4/2012 | Knebel et al. |
| 2012/0200693 A1 | | 8/2012 | Lippert et al. |
| 2013/0130937 A1 | | 5/2013 | Sun et al. |
| 2013/0222547 A1 | | 8/2013 | Van Rooyen et al. |
| 2013/0228705 A1 | | 9/2013 | Nishikawa et al. |
| 2013/0229665 A1 | | 9/2013 | Nomura |
| 2013/0286181 A1 | | 10/2013 | Betzig et al. |
| 2014/0104407 A1 | | 4/2014 | Ouchi |
| 2014/0240457 A1 | | 8/2014 | Xia |
| 2015/0022881 A1 | | 1/2015 | Loza et al. |
| 2015/0153560 A1 | | 6/2015 | Lippert et al. |
| 2015/0168702 A1 | | 6/2015 | Harris |
| 2015/0168706 A1 | | 6/2015 | Schweinitzer et al. |
| 2015/0177506 A1 | | 6/2015 | Nishiwaki |
| 2015/0185463 A1 | | 7/2015 | Ohki et al. |
| 2015/0253560 A1 | | 9/2015 | Otte et al. |
| 2015/0355449 A1 | | 12/2015 | Orth et al. |
| 2016/0070091 A1 | | 3/2016 | Hufnagel et al. |
| 2016/0124201 A1 | | 5/2016 | Kikuchi |
| 2016/0124203 A1 | | 5/2016 | Ryu |
| 2016/0131885 A1 | | 5/2016 | Nakayama et al. |
| 2016/0139394 A1 | | 5/2016 | Taniguchi et al. |
| 2016/0154236 A1 | | 6/2016 | Siebenmorgen et al. |
| 2016/0170195 A1 | | 6/2016 | Siebenmorgen et al. |
| 2016/0291304 A1 | | 10/2016 | Singer et al. |
| 2016/0305883 A1 | | 10/2016 | Betzig et al. |
| 2016/0306154 A1 | | 10/2016 | Iguchi et al. |
| 2016/0320600 A1 | | 11/2016 | Dake et al. |

(56) References Cited

U.S. PATENT DOCUMENTS

| | | |
|---|---|---|
| 2016/0334613 A1 | 11/2016 | Ishiwata |
| 2017/0139193 A1 | 5/2017 | Iguchi |
| 2018/0088308 A1 | 3/2018 | Liu et al. |

FOREIGN PATENT DOCUMENTS

| | | |
|---|---|---|
| CN | 201974574 | 9/2011 |
| CN | 102226852 | 10/2011 |
| CN | 102540476 | 7/2012 |
| CN | 202351503 | 7/2012 |
| CN | 102749834 | 10/2012 |
| CN | 103099635 | 5/2013 |
| CN | 103278919 | 9/2013 |
| CN | 103411936 | 11/2013 |
| CN | 103424861 | 12/2013 |
| DE | 3422143 | 12/1985 |
| DE | 19824460 | 12/1999 |
| DE | 102004034997 | 2/2006 |
| DE | 112012002445 | 4/2014 |
| EP | 0795770 | 9/1997 |
| EP | 1617258 | 1/2006 |
| EP | 1617267 | 1/2006 |
| EP | 1617375 | 1/2006 |
| EP | 1918756 | 5/2008 |
| EP | 1317685 | 8/2008 |
| FI | 181211 | 5/1990 |
| FR | 2754070 | 4/1998 |
| GB | 2416261 | 1/2006 |
| GB | 2416440 | 1/2006 |
| GB | 2416449 | 1/2006 |
| HU | 200500143 | 7/2006 |
| JP | H08-094938 | 4/1996 |
| JP | H10-160740 | 6/1998 |
| JP | 2001272346 | 10/2001 |
| JP | 2014-026194 | 2/2014 |
| KR | 20100033047 | 3/2010 |
| KR | 20140068359 | 6/2014 |
| TW | 201341845 | 10/2013 |
| WO | WO 99/53355 | 10/1999 |
| WO | WO 02/37157 | 5/2002 |
| WO | WO 03/002972 | 1/2003 |
| WO | WO 2007/045499 | 4/2007 |
| WO | WO 2008/092107 | 7/2008 |
| WO | WO 2010/108042 | 9/2010 |
| WO | WO 2016/054474 | 4/2016 |

OTHER PUBLICATIONS

Aguet et al., "Advances in Analysis of Low Signal-to-Noise Images Link Dynamin and AP2 to the Functions of an Endocytic Checkpoint" *Developmental Cell*, 2013, 26(3):279-291.

Ahrens et al., "Whole-brain functional imaging at cellular resolution using light-sheet microscopy" *Nature Methods*, 2013, 10(5):412-420.

Botcherby et al., "Aberration-free optical refocusing in high numerical aperture microscopy" *Optics letters*, 2007, 32(14):2007-2009.

Botcherby et al., "Aberration-free three-dimensional multiphoton imaging of neuronal activity at kHz rates" *Proceesings of the National Academy of Sciences*, 2012, 109(8):2919-2924.

Butcher et al., "A tense situation: forcing tumour progression" *Nature Review Cancer*, 2009, 9(2):108-122.

Chen et al., "Lattice light-sheet microscopy: Imaging molecules to embryos at high spatiotemporal resolution" *Science*, 2014, 345(6208):1257998.

Dean et al., "Uniform and scalable light-sheets generated by extended focusing" *Optics Express*, 2014, 22(21):26141.

Fahrbach et al., "A line scanned light-sheet microscope with phase shaped self-reconstructing beams" *Optics Express*, 2010, 18(23):24229.

Friedl et al., "Migration of highly aggressive MV3 melanoma cells in 3-dimensional collagen lattices results in local matrix reorganization and shedding of alpha2 beta1 integrins and CD44" *Cancer Research*, 1997, 57(10):2061-2070.

Friedl et al., "Plasticity of cell migration: a multiscale tuning model" *The Journal of Cell Biology*, 2009, 188(1):11-19.

Gao et al., "Noninvasive Imaging beyond the diffraction limit of 3D dynamics in Thickly Fluorescent Specimens" *Cell*, 2012, 151(6):1370-1385.

Gebhardt et al., "Single-molecule imaging of transcription factor binding to DNA in live mammalian cells" *Nature Methods*, 2013, 10(50:421-426.

International Preliminary Report on Patentability in International Application No. PCT/US2016/029329 dated Nov. 16, 2017.

International Search Report and Written Opinion in International Application No. PCT/US2016/029329 dated Aug. 17, 2016.

International Search Report and Written Opinion issued in International Patent Application No. PCT/US2017/027093, dated Aug. 22, 2017.

Jaqaman et al., "Robust single-particle tracking in live-cell time-lapse sequences" *Nature Methods*, 2008, 5(8):695-702.

Keller, "Imaging Morphogenesis: Technological Advances and Biological Insights" *Science*, 2013, 340(6137):1234168.

Krahn et al., "Fluorescently labeled collagen binding proteins allow specific visualization of collagen in tissues and live cell culture" *Analytical Biochemistry*, 2006, 350(2):177-185.

Martin et al., "A Growth Factor-Induced, Spatially Organizing Cytoskeletal Module Enables Rapid and Persistent Fibroblast Migration" *Developmental Cell*, 2014, 30(6):701-716.

Mendez et al., "Vimentin induces changes in cell shape, motility, and adhesion during the epithelial to mesenchymal transition" *The FASEB Journal*, 2010, 24(6):1838-1851.

Mohan et al., "Three Dimensional Fluorescence Imaging Using Multiple Light-Sheet Microscopy," *PLoS One*, 2014, 9(6):e96551.

Planchon et al., "Rapid three-dimensional isotropic imaging of living cells using Bessel beam plane illumination," *Nature Methods*, 2011, 8(5):417-423.

Shaner et al., "A bright monomeric green fluorescent protein derived from Branchiostoma lanceolatum" *Nature Methods*, 2013, 10(5):407-409.

Shaner et al., "Improving the photostability of bright monomeric orange and red fluorescent proteins," *Nat Methods*, 2008, 5(6):545-551.

Vettenburg et al., "Light-sheet microscopy using an Airy beam," *Nature Methods*, 2014, 11(5):541-544.

Wang et al., "Long-Range Force Transmission in Fibrous Matrices Enables by Tension-Driven Alignment of Fibers" *Biophysical Journal*, 2014, 107(11):2592-2603.

Wu et al., "Spatially isotropic four-dimensional imaging with dual-view plane illumination microscopy" *Nature Biotechnology*, 2013, 31(11):1032-1038.

Zong et al., "Large-field high-resolution two-photon digital scanned light-sheet microscopy," *Cell Research*, 2015, 25:254-257.

* cited by examiner

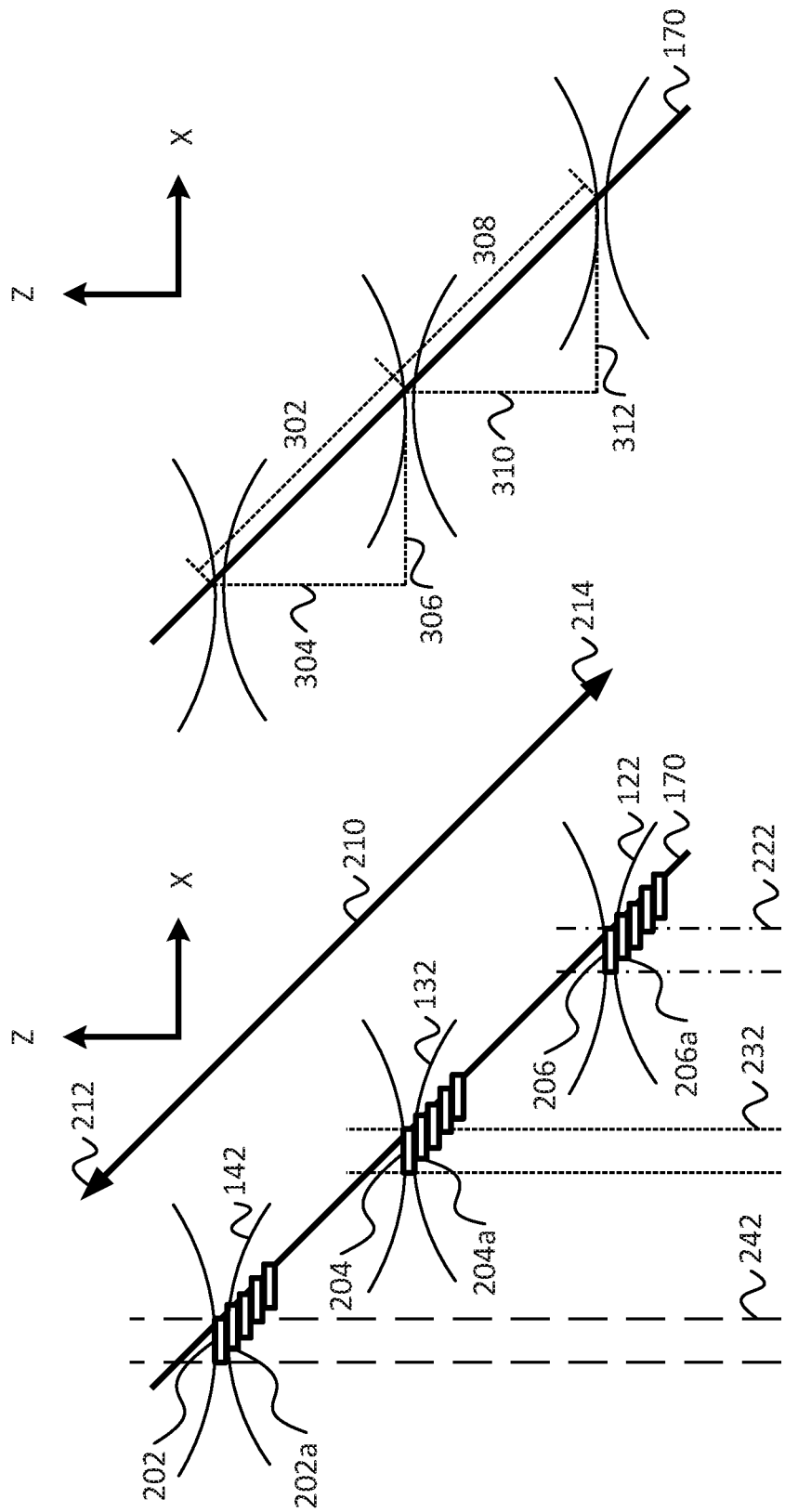

LIGHT-SHEET MICROSCOPE WITH PARALLELIZED 3D IMAGE ACQUISITION

CROSS-REFERENCE TO RELATED APPLICATIONS

This application is a national phase application under 35 U.S.C. § 371 of International Application No. PCT/US2017/027093, filed Apr. 12, 2017 which claims the benefit of U.S. Provisional Patent Application No. 62/321,496 filed on Apr. 12, 2016 and entitled "LIGHT-SHEET MICROSCOPE WITH PARALLELED 3D IMAGE ACQUISITION," the contents of each application referenced above are expressly incorporated herein by reference in its their entirety.

FIELD OF INVENTION

The present disclosure is generally related to light-sheet fluorescence microscopy (LSFM), and more particularly to parallelization techniques for use in generating images using LSFM techniques.

BACKGROUND

A major bottle neck in 3D fluorescence microscopy is the serial acquisition of 2D images to from an image volume, which can be prohibitive to capturing images of fast biological processes. Various implementations exist that can image multiple focal planes simultaneously, however, the amount of fluorescence light reaching a particular detection plane is reduced by the degree of parallelization, with the majority of the light being distributed as useless blur on all other detection planes.

For example, and referring to FIG. 7, an exemplary microscope configured to capture images of multiple focal planes simultaneously according to the prior art is shown as a microscope 700. As shown in FIG. 7, the microscope 700 includes a light source 710, an illumination objective 720, a detection objective 730, a beam splitter 740, and cameras 750, 760. The light source 710 may produce a beam of light 712 that is used to illuminate a sample within a volume 702, and the detection objective 730 may detect fluorescence emitted by the sample in response to being illuminated by the beam of light 712, and may provide the detected fluorescence to the beam splitter 740 as detected light 732. The camera 750 may be configured to image a first portion of the volume 702, such as the region 704, using a first portion of the detected light 732 provided to the camera 750 by the beam splitter 740, and the camera 760 may be configured to image a second portion of the volume 702, such as the region 706, using a second portion of the detected light 732 provided to the camera 760 by the beam splitter 740.

In the microscope configuration illustrated in FIG. 7, the first portion of the detected light 732 that is provided to the camera 750 may include portions of light detected from both the region 704 and the region 706, where the light detected from the region 704 is in focus (e.g., suitable for producing an image), but the light detected from the region 706 will be out of focus, which degrades/blurs the image produced by the camera 750. Similarly, the second portion of the detected light 732 that is provided to the camera 760 may include portions of light detected from both the region 704 and the region 706, where the light detected from the region 706 is in focus (e.g., suitable for producing an image), but the light detected from the region 704 will be out of focus, which degrades/blurs the image produced by the camera 760. Thus, for microscopes such as the microscope 700, it has been shown that, as more detection planes are utilized, the amount of fluorescence light reaching a particular detection plane is reduced by the degree of parallelization, with the majority of the light being distributed as useless blur on all other detection planes. For a sample with limited fluorescence emission, such a scheme consequently requires longer exposure times, which negates the speed advantage of parallelized acquisition.

Referring to FIG. 8, another exemplary microscope configured to capture images of multiple focal planes simultaneously according to the prior art is shown as a microscope 800. As shown in FIG. 8, the microscope 800 includes a light source 810, an illumination objective 820, a detection objective 830, and a camera 840. The light source 810 may produce a beam of light 812 that may be used to illuminate a sample within a volume 701 along multiple illumination planes 802, 803, 804, 805. It is noted that the microscope 800 may include one or more components (e.g., beam splitters, etc.) for processing the beam of light 812 in order to illuminate the sample along the multiple illumination planes, and such components have not been shown in order to simplify the description of FIG. 8. The detection objective 830 may detect fluorescence emitted by the sample in response to being illuminated along each of the illumination planes 802-805, and may provide the detected fluorescence to the camera 840 as detected light 832. The detected light 832 is split into multiple sub-beams by a diffraction grating. The same grating also imparts a varying degree of defocus to each beam. The camera 840 may be configured to capture all sub-beams, which will form images from the different focal planes in different areas of the camera. For example, the camera 840 may generate a first image corresponding to the imaging plane 802, a second image corresponding to the imaging plane 803, a third image corresponding to the imaging plane 804, and a fourth image corresponding to the imaging plane 805, which are laterally displaced on the camera chip. Every image plane contains an equal fraction of the fluorescence emitted from every plane, but one of them is in focus and produces a sharp image. For example, illumination plane 802 contributes fluorescence to all four images that are formed on the camera, but only yields a useful signal on one image. This means that only a fourth of the fluorescence signal 832 is available to form useful images for this example. If a higher degree of parallelization is chosen, a correspondingly smaller fraction of fluorescence light is available to form meaningful images. Due to the configuration of the microscope 800, each of the images formed on the camera 840 for a particular one of the imaging planes 802-805 may be blurred by fluorescence emitted in response to illumination of the other imaging planes. For example, the image corresponding to the fluorescence emitted along the imaging plane 802 may be blurred by the fluorescence emitted along the imaging planes 803-805, the image corresponding to the fluorescence emitted along the imaging plane 803 may be blurred by the fluorescence emitted along the imaging planes 802, 804, and 805, the image corresponding to the fluorescence emitted along the imaging plane 804 may be blurred by the fluorescence emitted along the imaging planes 802, 803, and 805, and the image corresponding to the fluorescence emitted along the imaging plane 805 may be blurred by the fluorescence emitted along the imaging planes 802-804. Thus, the configuration of the microscope 800, while allowing parallel image processing, produces images that are degraded by blurring caused by illuminating the sample along multiple imaging planes. As before, the configuration of microscope 800 results in a reduction of the fluorescence signal 832 that can be used to form sharp images, with the loss of signal growing with the degree of parallelization. Thus, the microscope 800 will require long integration times for dimly fluorescent samples, negating the speed gains that parallelized acquisition promises.

From the foregoing it has been shown that existing microscope systems configured to capture multiple images of a sample or volume in parallel suffer from several disadvantages (e.g., increased blur, decreased photon detection, and the like).

SUMMARY

Various embodiments of an imaging system that provides a parallelized image acquisition scheme that overcomes the drawbacks described above with respect to FIGS. 7 and 8 are disclosed. According to embodiments, an imaging system is configured to image each focal plane uniquely onto its corresponding detector while simultaneously reducing blur on adjacent focal planes. This enables the imaging system to increase the volumetric image acquisition rate without requiring a stronger fluorescence signal. In an additional or alternative embodiment, the imaging system may be operated at a slower volumetric image acquisition rate (e.g., that of a conventional microscope) while providing longer exposure times with lower excitation power. This may reduce or delay photo-bleaching (e.g., a photochemical alteration of the dye that causes it to no longer be able to fluoresce) and photo-toxicity (e.g., light-induced damage to the specimen), thereby extending the useful life of the sample.

Some embodiments of the present methods (e.g., for performing parallelized image acquisition with reduced photo-bleaching and blurring) comprise: generating, by a light source, a beam of light; splitting the beam of light to produce a plurality of beams of light of equal power, where the power of each of the plurality of beams of light is less than the power of the beam of light generated by the light source; illuminating a sample using the plurality of beams of light, where the sample is disposed on a coverslip, and the coverslip is oriented such that different portions of the sample are illuminated in parallel by a different one of the plurality of beams of light, and beams of light that illuminate adjacent portions of the sample are spatially separated with respect to each other; capturing, by a plurality of cameras, image data representative of fluorescence emitted by the illuminated portions of the sample, where each of the plurality of cameras captures image data representative of fluorescence emitted by a respective one of the different portions of the sample in parallel; and generating one or more images representative of the sample based on the captured image data.

In some embodiments of the present methods, the plurality of beams of light comprise at least a first beam of light and a second beam of light, and the plurality of cameras comprise at least a first camera and a second camera. In some embodiments, the first camera captures first image data representative of fluorescence emitted by a first portion of the sample that has been illuminated by the first beam of light, and the second camera captures second image data representative of fluorescence emitted by a second portion of the sample that has been illuminated by the second beam of light.

In some embodiments of the present methods, during the illumination, each of the plurality of beams of light is separated from adjacent ones of the plurality of beams of light by a threshold distance.

In some embodiments of the present methods, the cover slip is oriented at an angle with respect to an illumination objective and a detection objective, the illumination objective is configured to illuminate the different portions of the sample using the plurality of beams of light, and the detection objective is configured to detect the fluorescence emissions emitted by the illuminated sample.

Some embodiments of the present methods further comprise: moving the coverslip to a new location, where movement of the coverslip causes additional portions of the sample to be illuminated by the plurality of beams of light, different ones of the additional portions of the sample are illuminated in parallel by different ones of the plurality of beams of light, and the beams of light that illuminate adjacent ones of the additional portions of the sample are spatially separated with respect to each other; capturing additional image data representative of fluorescence emitted by the additional portions of the sample, where each of the plurality of cameras captures image data representative of fluorescence emitted by a respective one of the additional portions of the sample in parallel; and generating one or more additional images representative of the additional image data. Some embodiments, further comprise: generating a 3D data set for each camera, where, for each camera, the 3D data set comprises a series of 2D images generated based on the image data captured while the sample is at an initial position and additional image data captured after the sample has been moved to one or more additional locations. Some embodiments further comprise: generating a 3D image of the entire sample by combining the 3D data sets generated for each of the cameras.

Some embodiments of the present computer-readable storage media store instructions that, when executed by a processor, cause the processor to perform operations for performing parallelized image acquisition with reduced photo-bleaching and blurring. In some embodiments, the operations comprise: generating, by a light source, a beam of light; splitting the beam of light to produce a plurality of beams of light of equal power, where the power of each of the plurality of beams of light is less than the power of the beam of light generated by the light source; illuminating a sample using the plurality of beams of light, where the sample is disposed on a coverslip, the coverslip is oriented such that different portions of the sample are illuminated in parallel by a different one of the plurality of beams of light, and beams of light that illuminate adjacent portions of the sample are spatially separated with respect to each other; capturing, by a plurality of cameras, image data representative of fluorescence emitted by the illuminated portions of the sample, where each of the plurality of cameras captures image data representative of fluorescence emitted by a respective one of the different portions of the sample in parallel; and generating one or more images representative of the sample based on the captured image data.

In some embodiments of the present computer-readable storage media, the plurality of beams of light comprise at least a first beam of light and a second beam of light, the plurality of cameras comprise at least a first camera and a second camera, the first camera captures first image data representative of fluorescence emitted by a first portion of the sample that has been illuminated by the first beam of light, and the second camera captures second image data representative of fluorescence emitted by a second portion of the sample that has been illuminated by the second beam of light.

In some embodiments of the present computer-readable storage media, during the illumination, each of the plurality of beams of light is separated from adjacent ones of the plurality of beams of light by a threshold distance.

In some embodiments of the present computer-readable storage media, the cover slip is oriented at an angle with respect to an illumination objective and a detection objective, the illumination objective is configured to illuminate the different portions of the sample using the plurality of beams of light, and the detection objective is configured to detect the fluorescence emissions emitted by the illuminated sample.

In some embodiments of the present computer-readable storage media, the operations further comprise: moving the coverslip to a new location, where movement of the coverslip causes additional portions of the sample to be illuminated by the plurality of beams of light, different ones of the additional portions of the sample are illuminated in parallel by different ones of the plurality of beams of light, and the beams of light that illuminate adjacent ones of the additional portions of the sample are spatially separated with respect to each other; capturing additional image data representative of fluorescence emitted by the additional portions of the sample, where each of the plurality of cameras captures image data representative of fluorescence emitted by a respective one of the additional portions of the sample in parallel; and generating one or more additional images representative of the additional image data. In some embodiments, the operations further comprise: generating a 3D data set for each camera, where, for each camera, the 3D data set comprises a series of 2D images generated based on the image data captured while the sample is at an initial position and additional image data captured after the sample has been moved to one or more additional locations. In some embodiments, the operations further comprise: generating a 3D image of the entire sample by combining the 3D data sets generated for each of the cameras.

Some embodiments of the present imaging systems (e.g., for performing parallelized image acquisition with reduced photo-bleaching and blurring) comprise: a light source to generate a beam of light; one or more beam splitters configured to produce a plurality of beams of light of equal power, where the power of each of the plurality of beams of light is less than the power of the beam of light generated by the light source; an illumination objective to illuminate a sample using the plurality of beams of light, where the sample is disposed on a coverslip; a detection objective to detect fluorescence emitted by the sample, where the coverslip is oriented such that different portions of the sample are illuminated in parallel by a different one of the plurality of beams of light in a staggered configuration such that beams of light that illuminate adjacent portions of the sample are spatially separated with respect to each other along a detection direction; a plurality of cameras to capture image data representative of fluorescence emitted by the illuminated portions of the sample as detected by the detection objective, where each of the plurality of cameras captures image data representative of fluorescence emitted by a respective one of the different portions of the sample in parallel; at least one processor to generate one or more images representative of the sample based on the captured image data; and a memory coupled to the at least one processor.

In some embodiments of the present systems, the plurality of beams of light comprise at least a first beam of light and a second beam of light, the plurality of cameras comprise at least a first camera and a second camera, the first camera captures first image data representative of fluorescence emitted by a first portion of the sample that has been illuminated by the first beam of light, and the second camera captures second image data representative of fluorescence emitted by a second portion of the sample that has been illuminated by the second beam of light, and the first portion and the second portion of the sample are staggered with respect to each other.

In some embodiments of the present systems, the cover slip is oriented at a forty-five degree (45°) angle with respect to the illumination objective and the detection objective, and the angle of the cover slip provides the staggered configuration.

Some embodiments of the present systems further comprise: means for moving the coverslip to a new location, where movement of the coverslip causes additional portions of the sample to be illuminated by the plurality of beams of light, different ones of the additional portions of the sample are illuminated in parallel by different ones of the plurality of beams of light, the beams of light that illuminate adjacent ones of the additional portions of the sample are spatially separated with respect to each other, and the plurality of cameras capture additional image data representative of fluorescence emitted by the additional portions of the sample. In some embodiments, the image data and the additional image data are stored in the memory, and the at least one processor is configured to: generate a 3D data set for each camera, where, for each camera, the 3D data set comprises a series of 2D images generated based on the image data captured while the sample is at an initial position and additional image data captured after the sample has been moved to one or more additional locations; and generate a 3D image of the entire sample by combining the 3D data sets generated for each of the cameras.

The term "coupled" is defined as connected, although not necessarily directly, and not necessarily mechanically. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially" and "approximately" may be substituted with "within [a percentage] of" what is specified, where the percentage includes 0.1, 1, 5, and 10%.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, an apparatus that "comprises," "has," "includes," or "contains" one or more elements possesses those one or more elements, but is not limited to possessing only those elements. Likewise, a method that "comprises," "has," "includes," or "contains" one or more steps possesses those one or more steps, but is not limited to possessing only those one or more steps.

Any embodiment of any of the apparatuses, systems, and methods can consist of or consist essentially of—rather than comprise/include/contain/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

Some details associated with the embodiments described above and others are described below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers.

FIG. 2 is a diagram illustrating an embodiment for parallel illumination of different portions of a sample and capturing image data of the different illuminated portions of the sample in parallel using an imaging system according to embodiments;

FIG. 3 is a diagram illustrating embodiments for configuring illumination of a sample and imaging of a sample using an imaging system according to embodiments;

DETAILED DESCRIPTION OF ILLUSTRATIVE EMBODIMENTS

Figure 1:
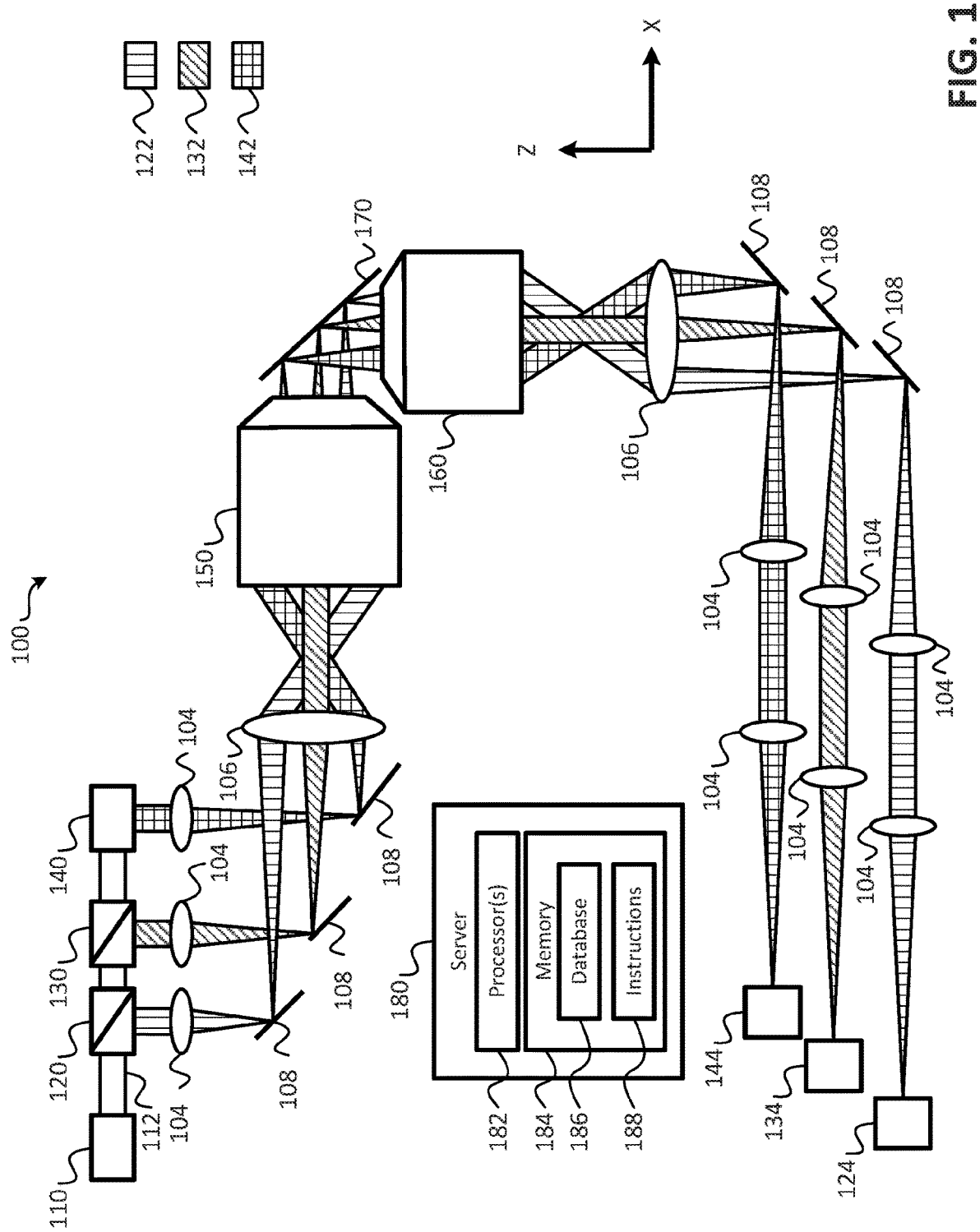
FIG. 1 is a block diagram of an imaging system that provides parallelized three-dimensional (3D) image acquisition of a sample according to embodiments.

Referring to FIG. 1, a block diagram of an imaging system that provides parallelized three-dimensional (3D) image acquisition of a sample according to embodiments is shown as an imaging system 100. In an embodiment, the imaging system 100 may operate to perform parallelized 3D image acquisition of a sample. In an embodiment, the sample may be mounted on a coverslip 170. As shown in FIG. 1, the imaging system 100 includes a light source 110, one or more beam splitters (e.g., beam splitters 120, 130), a mirror 140, an illumination objective 150, a detection objective 160, a plurality of cameras 124, 134, 144, a plurality of lenses 104, 106 (e.g., tube lenses), and a plurality of mirrors 108. It is noted that the arrangement of the various components of the imaging system 100 illustrated in FIG. 1 are provided for purposes of illustration, rather than by way of limitation, and that components may be added to, or removed from the imaging system 100 without departing from the scope of the present disclosure. For example, the configuration illustrated in FIG. 1 provides for parallel illumination of a three different portions of a sample using three beams of light, and provides for capturing images of the three different portions, but in other embodiments, two beams of light may be used to illuminate the sample in parallel, or more than three beams of light may be used to illuminate the sample in parallel, and an appropriate number of cameras may be used to capture image data of the illuminated portions of the sample.

In an embodiment, the imaging system 100 may further comprise a server 180. The server 180 may include one or more processors 182, and a memory 184. The memory 184 may store a database 186 and instructions 188. In an embodiment, the database 186 may be used to store image data captured by the cameras 124, 134, 144, and the instructions 188 may include instructions that, when executed by the one or more processor(s) 182, cause the one or more processor(s) 182 to control operations of the imaging system 100 to acquire and/or generate 3D images of the sample disposed on the cover slip 170. It is noted that although a single server 180 is shown, in an embodiment, more than one server 180 may be utilized in conjunction with the imaging system 100 to perform the operations described herein.

The light source 110 may be configured to generate a beam of light 112, and the one or more beam splitters 120, 130, along with the mirror 140 may be arranged to produce a plurality of beams of light (e.g., the beams of light 122, 132, 142) from the beam of light 112. In an embodiment, each of the plurality of beams of light 122, 132, 142 may be of equal power with respect to one another. For example, when the plurality of beam of light includes three beams of light, as illustrated in FIG. 1, the beam splitter 120 may divert approximately one third of the beam of light 112 to produce the beam of light 122, and the remaining two thirds of the beam of light 112 may be provided to the beam splitter 130. The beam splitter 130 may divert approximately one half of the beam of light received from the beam splitter 120 to produce the beam of light 132, and the remaining portion of the beam of light may be provided to the mirror 140 to produce the beam of light 142. From the foregoing it has been shown that the beam of light 122 comprises approximately one third of the beam of light 112, and the remaining two thirds is split equally between the beams of light 132, 142 (e.g., because the beam splitter 130 received two thirds of the beam of light 112, and diverted one third (e.g., half of the two thirds) of the beam of light 112 to form the beam 132 while the remaining one third was provided to the mirror 140 to produce the beam of light 142). Thus, each of the beams of light 122, 132, 142 comprises one third of the beam of light 112. In an embodiment, the power of each of the plurality of beams of light generated by the beam splitters 120, 130 and the mirror 140 may be less than the power of the beam of light 112 generated by the light source 110.

During operation of the imaging system 100, the beams of light 122, 132, 142 may be provided to the illumination objective 150. In an embodiment, the beams of light 122, 132, 142, may be provided to the illumination objective 150 using mirrors 108. The beams of light 122, 132, 142 may be passed through cylindrical lenses 104 to form a sheet of light with the beams of light 122, 132 and 142. These sheets of light may be imaged with tube lens 106 the illumination objective 150 onto the coverslip 170. As illustrated in FIG. 1, the mirrors 108 may be arranged and/or configured to create a spatial separation between the beams of light 122, 132, 142. As described in more detail below, this spatial separation may enable the sample being imaged to be illuminated in a staggered configuration or arrangement that reduces blurring of the acquired 3D images. In an embodiment, the staggered light sheets may be generated alternatively by a hologram displayed on one or multiple spatial light modulators or using custom made, static diffractive optical elements.

The illumination objective 150 may illuminate the sample using the beams of light 122, 132, 142. As shown in FIG. 1, the sample may be disposed on the cover slip 170. In an embodiment, the cover slip 170 may be oriented at a forty-five degree (45°) angle with respect to the illumination objective 150 and the detection objective 160. In an additional or alternative embodiment, the cover slip 170 may be oriented at an angle other than forty-five degrees (45°). For example, in some embodiments, the angle may be between forty degrees (40°) and fifty degrees (50°), or at another angle sufficient to provide a staggered configuration, as described in other parts of the present application. In an embodiment, the cover slip 170 may be oriented such that different portions of the sample are illuminated in parallel by a different one of the plurality of beams of light in a staggered configuration such that beams of light that illuminate adjacent portions of the sample are spatially separated with respect to each other along a detection direction.

For example, and referring to FIG. 2, a diagram illustrating an embodiment for parallel illumination of different portions of a sample and capturing image data of the different illuminated portions of the sample in parallel using an imaging system according to embodiments is shown. As shown in FIG. 2, the beams of light 122, 132, 142 may illuminate different portions of the sample in parallel along an illumination direction (e.g., along the x axis), and fluorescence emitted by the sample in response to the illumination may be detected along the detection direction (e.g., the z axis). For example, an in-focus region of the beam 142 may illuminate a first portion 202 of the sample, an in-focus region of the beam 132 may illuminate a second portion 204 of the sample, and an in-focus region of the beam 122 may illuminate a third portion 206 of the sample. Embodiments of imaging systems and techniques for generating an in-focus region are described in co-owned and commonly assigned: U.S. Provisional Patent Application No. 62/273,918, entitled "UNIFORM AND SCALABLE LIGHT-SHEETS GENERATED BY EXTENDED FOCUSING," filed on Dec. 31, 2015, and U.S. Provisional Patent Application No. 62/155,980, entitled "UNIFORM AND SCALABLE LIGHT-SHEETS GENERATED BY EXTENDED FOCUSING," filed on May 1, 2015, the contents of which are incorporated herein by reference in their entirety. As shown in FIG. 2, the in-focus regions 202, 204, 206 of the respective beams 142, 132, 122 are staggered with respect to each other such that, along the detection direction, the detected fluorescence emitted from the respective illuminated portions of the sample are staggered (e.g., spatially separated along the x axis). Thus, fluorescence 242 corresponding to fluorescence emitted by the sample in response to illumination by the in-focus region 202 is detected by a first camera (e.g., the camera 144) of the plurality of cameras, fluorescence 232 corresponding to fluorescence emitted by the sample in response to illumination by the in-focus region 204 is detected by a second camera (e.g., the camera 134 of FIG. 1) of the plurality of cameras, and fluorescence 222 corresponding to fluorescence emitted by the sample in response to illumination by the in-focus region 206 is detected by a third camera (e.g., the camera 124 of FIG. 1) of the plurality of cameras. Because the illumination of the sample is staggered, the fluorescence that is detected/used for imaging purposes by the plurality of cameras may be substantially blur free. That is to say that fluorescence detected with respect to one of the in-focus regions 202, 204, 206 may be substantially free from obscurities introduced by fluorescence emitted by adjacent in-focus regions of illumination. This also means that the fluorescence 242 corresponding to fluorescence emitted by the sample in response to illumination by the in-focus region 202 may be detected entirely by the first camera (e.g., the camera 144) of the plurality of cameras, fluorescence 232 corresponding to fluorescence emitted by the sample in response to illumination by the in-focus region 204 may detected entirely by a second camera (e.g., the camera 134 of FIG. 1) of the plurality of cameras, and fluorescence 222 corresponding to fluorescence emitted by the sample in response to illumination by the in-focus region 206 may be detected entirely by a third camera (e.g., the camera 124 of FIG. 1) of the plurality of cameras. Thereby, the degree of parallelization does not reduce the collected in focus signal.

Referring briefly to FIG. 3, a diagram illustrating embodiments for configuring illumination of a sample imaging of a sample using an imaging system according to embodiments is shown. As shown in FIG. 3, the staggered configuration of the illuminated regions of the sample provides that adjacent ones of the in-focus regions (e.g., the in-focus regions 202, 204, 206 of FIG. 2) where the sample is illuminated are separated by a first distance in the illumination direction (e.g., the x axis), and are separated by a second distance in the detection direction (e.g., the z axis). For example, the in-focus region 202 and the in-focus region 204 may be separated by a distance 304 in the detection direction, and may be separated by a distance 306 in the illumination direction. With respect to the cover slip 170, the in-focus region 202 may be separated from the in-focus region 204 by a distance 302. Similarly, the in-focus region 204 and the in-focus region 206 may be separated by a distance 310 in the detection direction, and may be separated by a distance 312 in the illumination direction. With respect to the cover slip 170, the in-focus region 204 may be separated from the in-focus region 206 by a distance 308. In an embodiment, the distances 304 and 310 may be approximately 40 microns, the distances 306, 312 may be approximately 40 microns, and the distances 302, 308 may be approximately 56 microns. In an embodiment, the various distances between adjacent detection regions, or in-focus regions may be determined based, at least in part, on a number of beams of light used to illuminate the sample in parallel. For example, if more beams are used, the distances may become smaller (e.g., due to the limited size of the coverslip 170), and if less beams are used, the distances may be greater. In an embodiment, the various distances between adjacent detection regions may be adjusted to a specific sample size to maximize parallelization and minimize blur by ensuring that the different image regions are sufficiently staggered.

Figure 7:
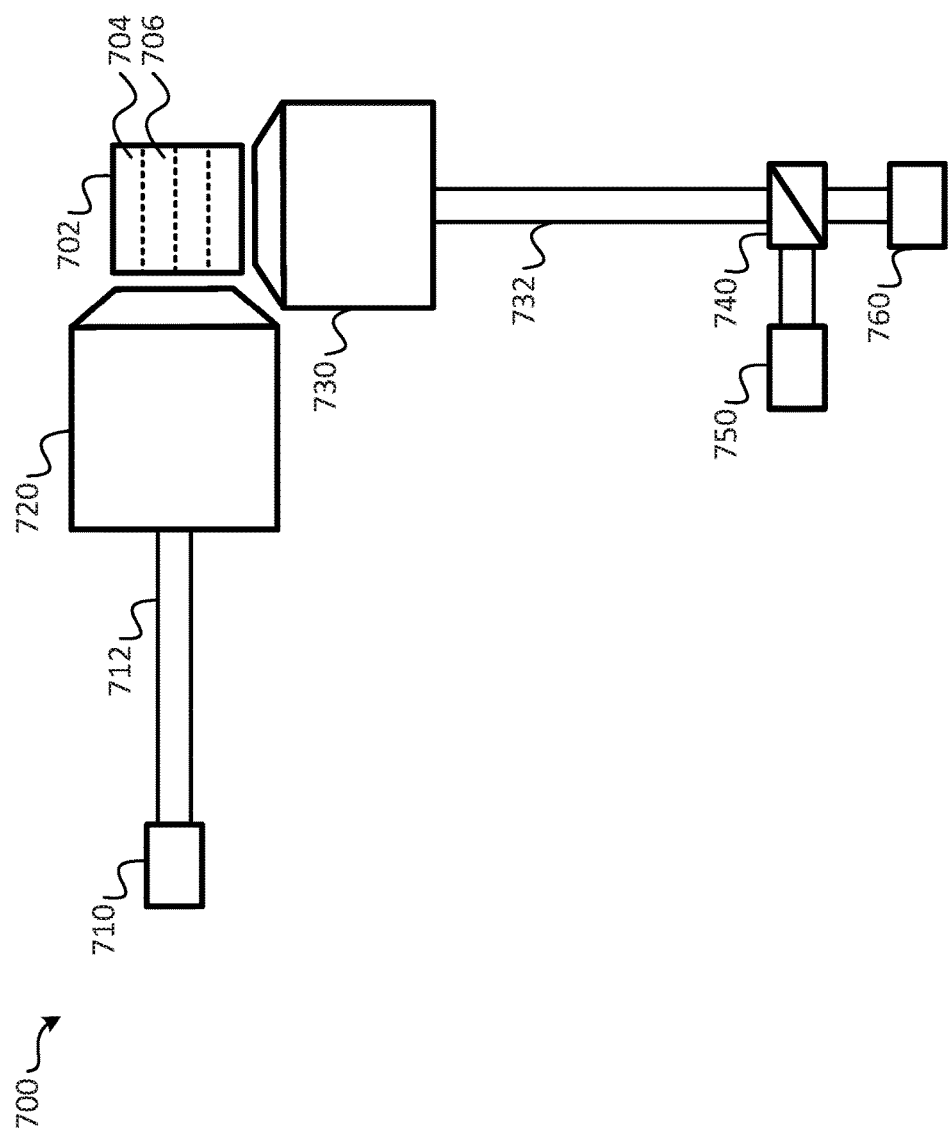
FIG. 7 is a block diagram of a first microscope configuration according to the prior art.
Figure 8:
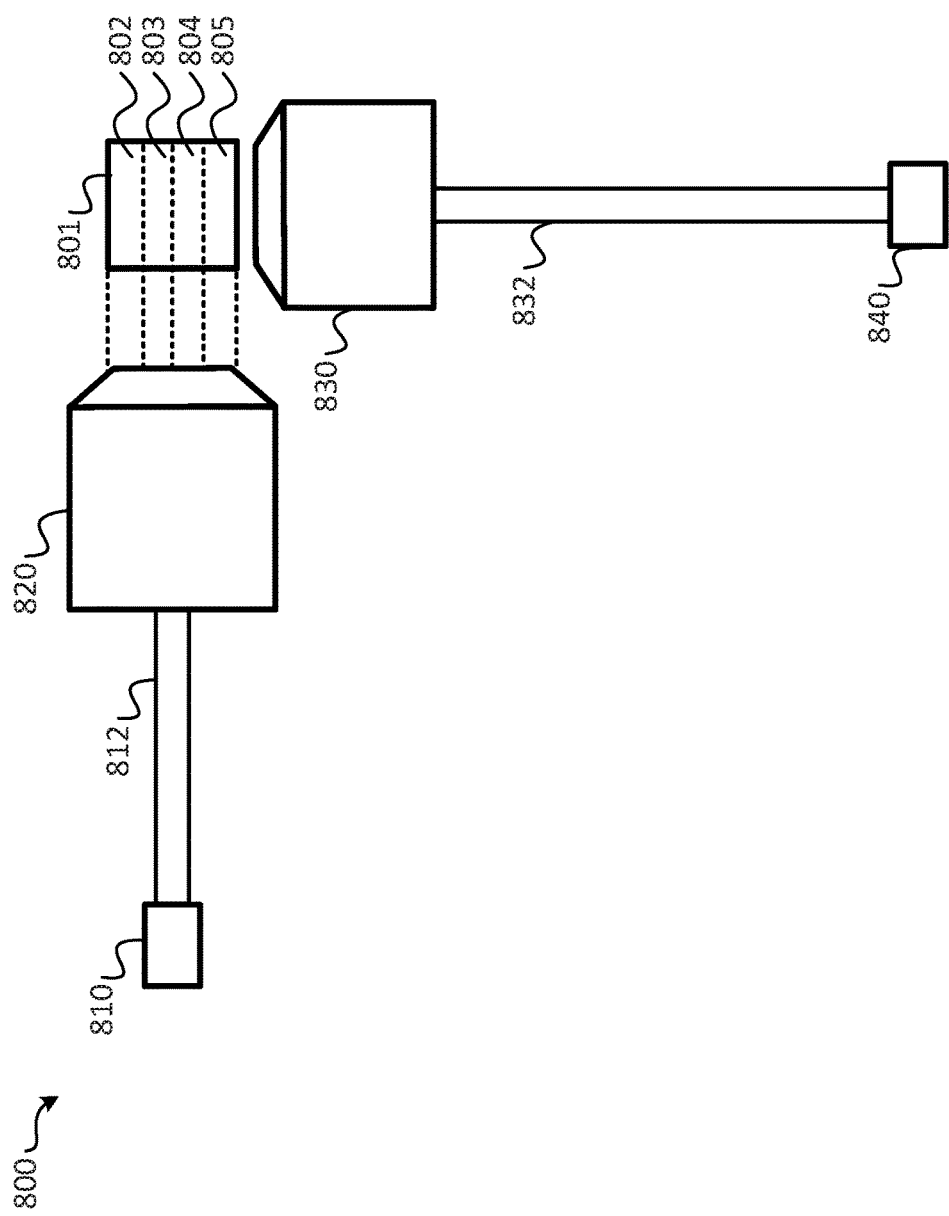
FIG. 8 is a block diagram of a second microscope configuration according to the prior art.

Referring back to FIG. 1, the detection objective may detect the fluorescence emitted by each of the illuminated portions of the sample in parallel, and may provide the detected fluorescence to respective ones of the plurality of cameras. For example, as briefly described with reference to FIG. 2, the fluorescence detected in response to illumination of a first portion of the sample by the beam of light 122 may be provided to the camera 124, the fluorescence detected in response to illumination of a first portion of the sample by the beam of light 132 may be provided to the camera 134, and the fluorescence detected in response to illumination of a first portion of the sample by the beam of light 142 may be provided to the camera 144. The fluorescence provided to each of the respective cameras may be substantially free from blur caused by fluorescence emitted by adjacent illuminated portions of the sample, or may have substantially reduced blur, as compared to the imaging systems 700, 800 described above with respect to FIGS. 7 and 8. Each of the plurality of cameras may be configured to generate image data representative of the detected fluorescence for a respective one of the illuminated portions of the sample. For example, and referring back to FIG. 2, the camera 144 may generate image data representative of the fluorescence emitted by the sample in response to illumination by the in-focus region 202 of the beam of light 142, and, due to the staggered configuration of the illuminated portions of the sample, the image data generated by the camera 144 may be substantially free from blur caused by illumination of the in-focus regions 204, 206 of the beams of light 132, 122, respectively. Similarly, the camera 134 may generate image data representative of the fluorescence emitted by the sample in response to illumination by the in-focus region 204 of the beam of light 132, and, due to the staggered configuration of the illuminated portions of the sample, the image data generated by the camera 134 may be substantially free from blur caused by illumination of the in-focus regions 202, 206 of the beams of light 122, 142, respectively. Additionally, the camera 124 may generate image data representative of the fluorescence emitted by the sample in response to illumination by the in-focus region 206 of the beam of light 122, and, due to the staggered configuration of the illuminated portions of the sample, the image data generated by the camera 124 may be substantially free from blur caused by illumination of the in-focus regions 202, 204 of the beams of light 132, 142, respectively. As the detected fluorescence is provided to the plurality of cameras, each of the plurality of cameras may generate image data corresponding to a respective portion of the illuminated sample in parallel. In an embodiment, the image data generated by each of the plurality of cameras may be stored at a database (e.g., the database 186).

In an embodiment, the sample may be fully imaged by moving the coverslip 170 in a coverslip movement direction, illustrated in FIG. 2 by the arrow 210. For example, movement of the coverslip 170 in the direction indicated by the arrow 212, and may be moved in the direction indicated by the arrow 214. Movement of the coverslip 170 may cause additional portions of the sample to be illuminated in parallel by different ones of the plurality of beams of light while maintaining spatial separation with respect to each other. For example, movement of the coverslip 170 may cause the in-focus region 202 of the beam of light 142 to illuminate a different portion 202a of the sample, and may cause the in-focus region 204 of the beam of light 132 to illuminated a different portion 204a of the sample, and may cause the in-focus region 206 of the beam of light 122 to illuminate a different portion 206a of the sample. In an embodiment, the imaging system 100 may include a piezo actuator or another nano-positioning stage (not shown in FIG. 1) to facilitate the movement of the coverslip 170. Once the coverslip 170 has been moved to the new location, the plurality of cameras may capture additional image data representative of fluorescence emitted by the additional portions of the sample, as described above. As the image data is captured, the coverslip 170 may be continued to move along the coverslip movement direction until the coverslip has been moved a threshold distance. In an embodiment, the threshold distance may correspond to an amount of movement of the coverslip 170 that causes the entire sample to have been imaged by the plurality of cameras. In an embodiment, once the coverslip 170 has been moved the threshold distance, the coverslip 170 may be moved in the opposite direction. While the coverslip 170 is being moved in the opposite direction, additional image data may be captured for the illuminated portions of the sample. Thus, the configuration of the imaging system 100 may facilitate bi-directional movement of the coverslip 170. This may speed up the image acquisition process relative to existing imaging systems. In an additional or alternative embodiment, rather than moving the coverslip 170 to facilitate imaging the entire sample, the beams of light used to illuminate the sample may be scanned across the sample/coverslip in parallel. In an embodiment, the beams of light may be scanned diagonally across the sample. In an embodiment utilizing scanning of the beams across the sample, the imaging system 100 may include one or more galvos to facilitate the scanning of the beams of light. Embodiments of imaging systems and techniques for scanning an in-focus region of a beam of light across a sample/coverslip are described in co-owned and commonly assigned: U.S. Provisional Patent Application No. 62/273,918, entitled "UNIFORM AND SCALABLE LIGHT-SHEETS GENERATED BY EXTENDED FOCUSING," filed on Dec. 31, 2015, and U.S. Provisional Patent Application No. 62/155,980, entitled "UNIFORM AND SCALABLE LIGHT-SHEETS GENERATED BY EXTENDED FOCUSING," filed on May 1, 2015, which are attached as Appendix A, and Appendix B, respectively.

Figure 4:
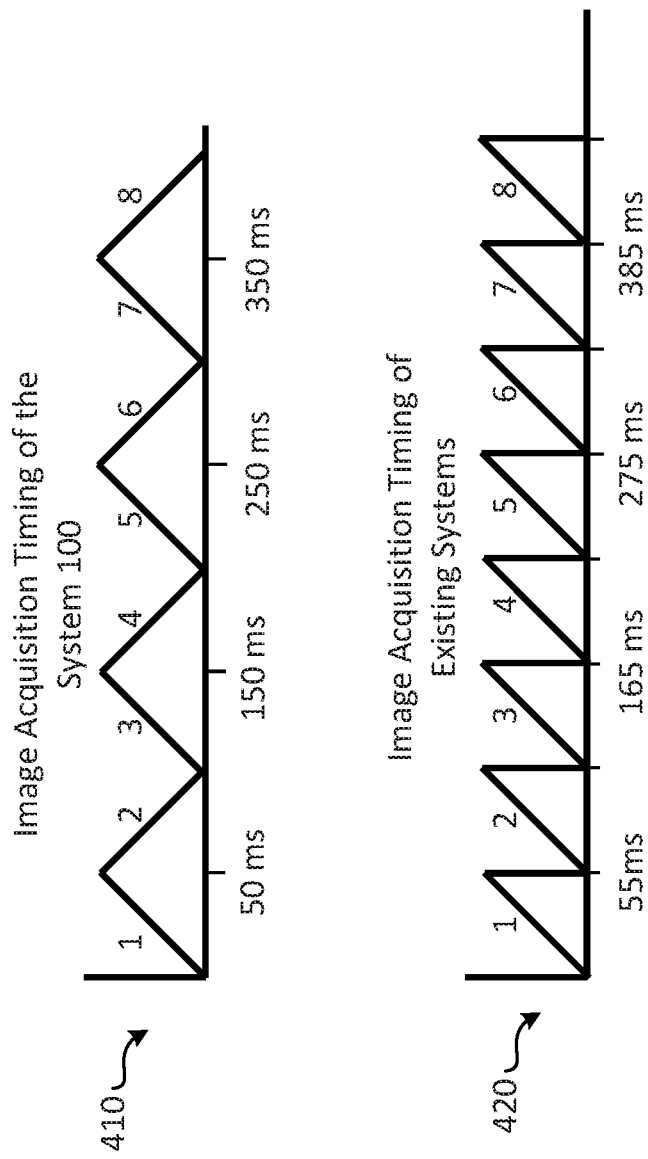
FIG. 4 is a diagram comparing imaging acquisition timing for an imaging system according to embodiments and prior art systems.

For example, and referring to FIG. 4, a diagram comparing imaging acquisition timing for an imaging system according to embodiments and prior art systems is shown. At 410, image acquisition timing for the imaging system 100 of FIG. 1 is shown, and, at 420, image acquisition timing for other imaging systems, such as the imaging systems 700 and 800 of FIGS. 7 and 8, respectively, is shown. As shown at 410, the imaging system 100 may be configured to capture a series of images that encompasses the entire sample every 50 milliseconds (ms), and, at 420, it is shown that existing systems may capture the same image series of the entire sample every 55 ms. Thus, the imaging system 100 may capture twenty such image series of the entire sample in approximately 1 second, while existing prior art systems would typically require about 1.1 seconds. The performance improvement provided by the imaging system 100 of embodiments is realized by the ability of the imaging system 100 to capture images while the coverslip 170 is moving in two directions. For example, the imaging system 100 may capture a first series of images of the sample while the coverslip 170 is being moved in the direction indicated by the arrow 212, and, upon capturing a complete image data set of the sample, may begin capturing a new image series of the sample while the coverslip 170 is being moved in the direction indicated by the arrow 214. In contrast, existing systems may capture a first full image of a sample while moving a sample in a first direction (indicated in FIG. 4 by the diagonal lines), and then reset the sample to its original starting position (indicated in FIG. 4 by the vertical lines) before moving the sample again in the first direction. The resetting of the sample may take approximately 5 ms or more, thus each full image captured by existing systems of the prior takes approximately 55 ms (50 ms to capture the series of images, and 5 ms to reset the sample). Thus, in this example, the imaging systems according to embodiments of the present disclosure may capture 11 series of images (e.g., 11 complete image data sets), while existing imaging systems, such as those illustrated in FIGS. 7 and 8, would only acquire 10 complete imaging series in the same time period. While this performance improvement may seem minor over the time period of a few images, in real world applications, the imaging system 100 will be used to capture hundreds or thousands of images series, and in such instances the performance of the imaging system 100 may be more easily understood and appreciated. Further, imaging systems, such as the imaging system 100, are often used to capture images of active biological processes, such as cellular processes, which are often rapidly undergoing changes. In such instances, the imaging system 100 may provide a more accurate or detailed depiction of the biological processes of the sample.

Figure 5:
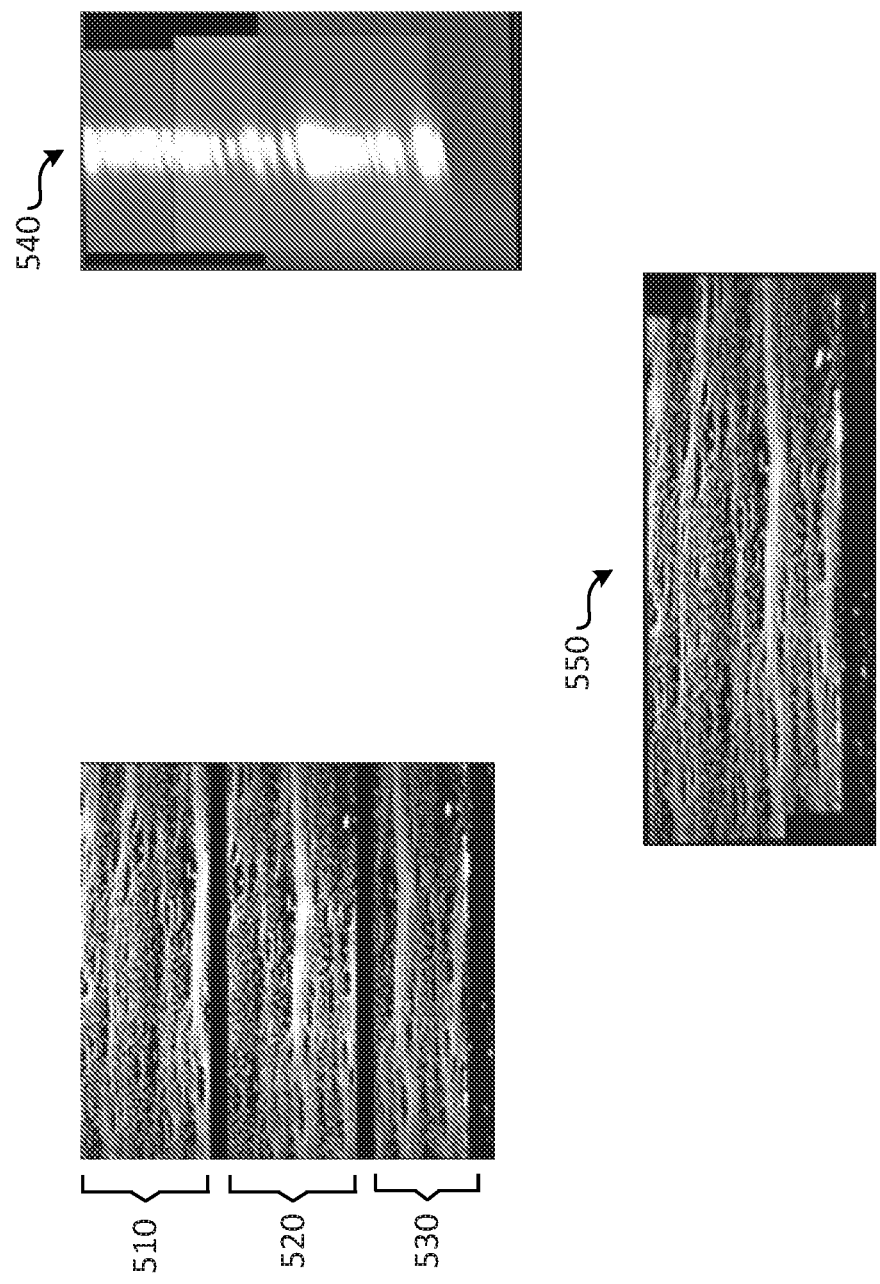
FIG. 5 illustrates an embodiment for generating images using an imaging system according to embodiments.

Referring back to FIG. 1, after capturing images of the different illuminated portions of the sample, the image data captured by the plurality of cameras may be used to generate one or more images that are representative of the sample. For example, and with reference to FIG. 5, an illustration of an embodiment for generating images using an imaging system according to embodiments is presented. As explained above, each of a plurality of cameras (e.g., the cameras 124, 134, 144 of FIG. 1) may capture image data associated with different illuminated portions of a sample, as described with reference to FIGS. 1 and 2. In FIG. 5, the image 510 may correspond to an image generated using image data captured by a first camera (e.g., the camera 124 of FIG. 1), the image 520 may correspond to an image generated using image data captured by a second camera (e.g., the camera 134 of FIG. 1), and the image 530 may correspond to an image generated using image data captured by a third camera (e.g., the camera 144 of FIG. 1), where the image data used to generate each of the images 510, 520, 530 was captured by the cameras in parallel as described above with respect to FIGS. 1 and 2. As can be seen in image 550, the image 510 is representative of a first portion of a sample (e.g., a sample consisting of 200 nanometer immobilized fluorescent beads), the image 520 is representative of a second portion of the sample, and the image 530 is representative of a third portion of the sample. The image data captured by the cameras may be used to generate a full (or final) image of the sample, as shown at 550. In an embodiment, image fusion techniques may be used to generate the full image of the sample. Further, the image 540, which is a side view of the sample, illustrates that the imaging system 100 of FIG. 1 is able to generate high resolution (e.g., little or no blur) 3D images of a sample by capturing image data using a plurality of cameras that operate in parallel.

Figure 6:
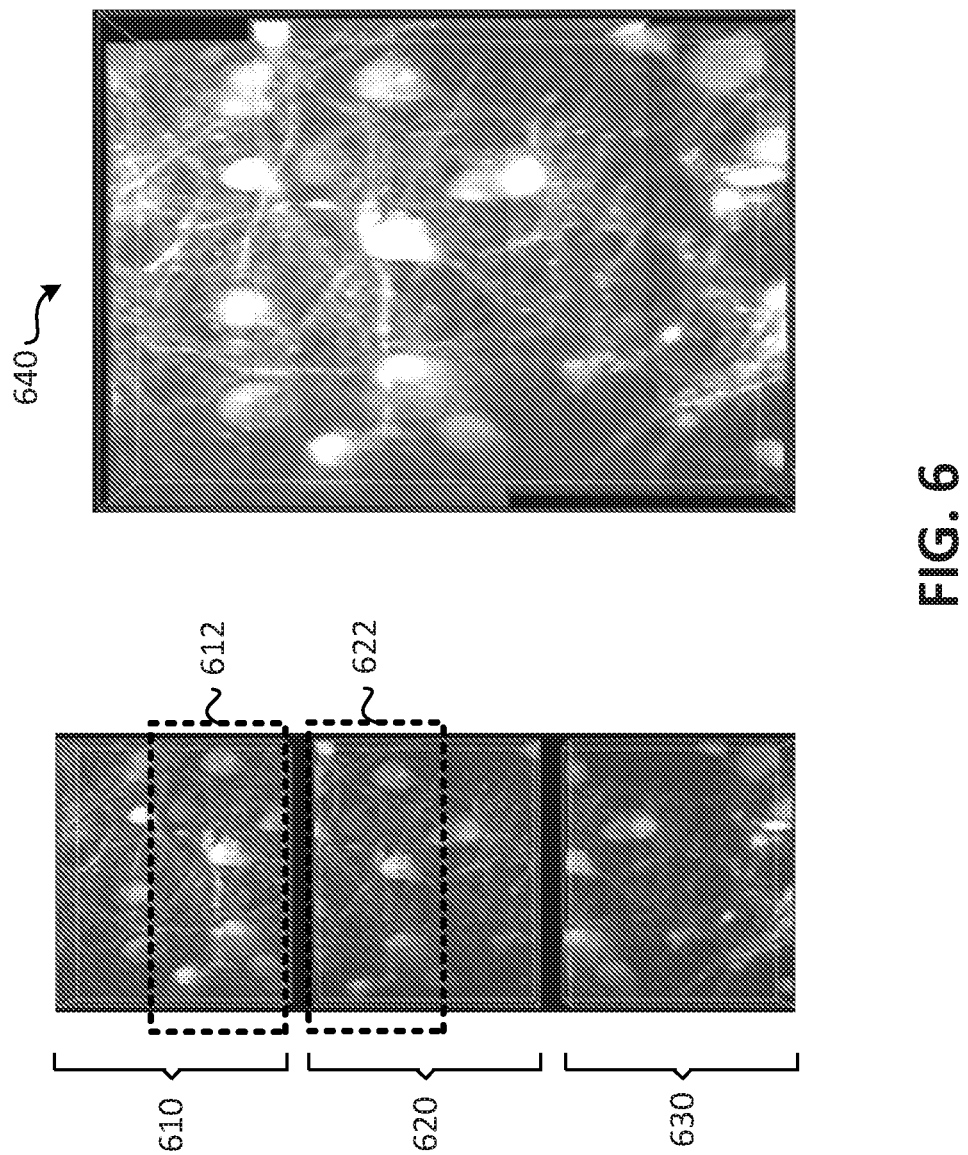
FIG. 6 illustrates another embodiment for generating images using an imaging system according to embodiments.

As another example of the operations of the imaging system 100, FIG. 6 illustrates another embodiment for generating images using an imaging system according to embodiments. In FIG. 6, various images of a sample (e.g., neurons labeled with Oregon Green BAPTA) are shown. On the left side of FIG. 6, a first image 610 of a first portion of the sample, a second image 620 of a second portion of the sample, and a third image 630 of a third portion of the sample are shown, and on the right side of FIG. 6, a final image 640 of the sample is shown. The images 610, 620, 630 were captured in parallel using an imaging system configured according to the configuration of the imaging system 100 illustrated in FIG. 1. It is noted that the images illustrated in FIGS. 5 and 6 show that a portion of one of the images may overlap with a portion of another one of the images. For example, and with reference to FIG. 6, a portion 612 of the first image 610 may overlap with a portion 622 of the second image 620. In an embodiment, the overlapping portions may be used to align/orient the image data from the different cameras when the final image of the sample is being generated. In an embodiment, the amount of overlap between the images may be controlled by controlling the movement of the coverslip. For example, if the coverslip starts at an initial position, each of the plurality of cameras may capture image data of the portion of the sample at their respective detection locations, and, as the coverslip is moved, overlap will begin to occur when one or more of the cameras begins detecting/capturing image data of the sample at a position that is the same as the starting position of an adjacent camera. In an embodiment, limiting the amount of overlap may further reduce the amount of time required to capture the images and reduce photo-bleaching and photo-toxicity.

Figure 9:
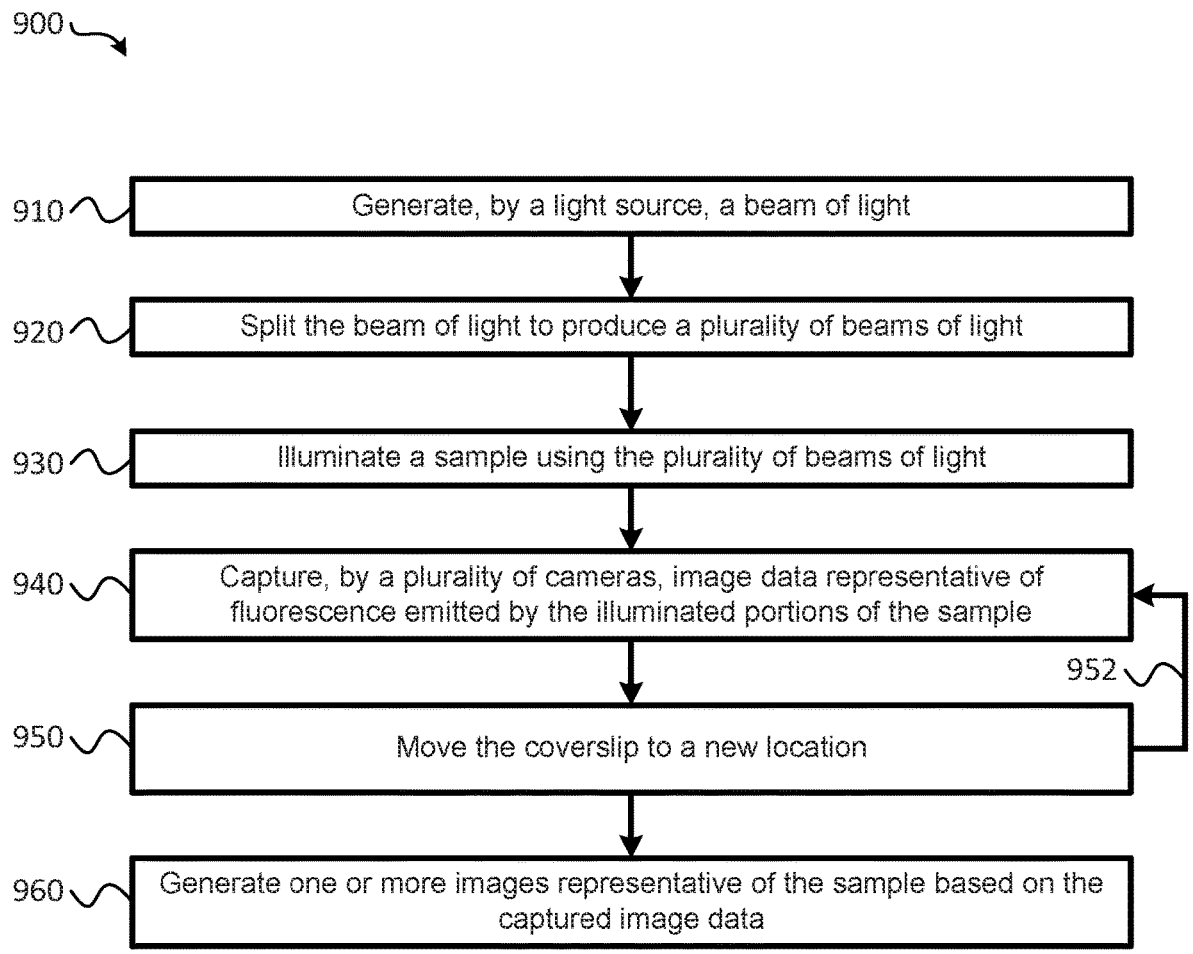
FIG. 9 is a flow diagram of a method performing parallelized three-dimensional (3D) image acquisition of a sample using an imaging system according to embodiments.

Referring to FIG. 9, a flow diagram of a method performing parallelized three-dimensional (3D) image acquisition of a sample using an imaging system according to embodiments is shown as a method 900. In an embodiment, the method 900 may be performed during operation of an imaging system, such as the imaging system 100 of FIG. 1. In an embodiment, the method 900 may be stored as instructions (e.g., the instructions 188 of FIG. 1) that, when executed by a processor (e.g., the processor 182 of FIG. 1), cause the processor to control operations of an imaging system configured to perform parallelized three-dimensional (3D) image acquisition of a sample.

At 910, the method 900 includes generating, by a light source, a beam of light. In an embodiment, the beam of light may be the beam of light 112 of FIG. 1 and the light source may be the light source 110 of FIG. 1. At 920, the method 900 may include splitting the beam of light to produce a plurality of beams of light. In an embodiment, each of the plurality of beams of light may be of equal power, and the power of each of the plurality of beams of light may be less than the power of the beam of light generated by the light source, as described above with reference to FIG. 1. At 930, the method 900 includes illuminating a sample using the plurality of beams of light. In an embodiment, the plurality of beams of light may be provided to an illumination objective configured to illuminate the different portions of the sample using the plurality of beams of light. In an embodiment, the sample may be disposed on a cover slip, and the cover slip may be oriented such that different portions of the sample are illuminated in parallel by a different one of the plurality of beams of light. For example, in an embodiment, the cover slip may be oriented at a forty-five degree (45°) angle with respect to an illumination objective and a detection objective. In an embodiment, beams of light that illuminate adjacent portions of the sample are spatially separated with respect to each other. For example, as described with reference to FIGS. 1 and 2, the beams of light that illuminate the sample may be staggered or offset in an illumination direction and a detection direction, which minimizes/reduces blurring. It also allows that almost all fluorescence generated by the illuminated portions of the sample forms a sharp image on each camera and is not wasted as unfocused blur on adjacent cameras, increasing the speed and sensitivity of the instrument. In an embodiment, the illumination of the sample may cause the sample to emit fluorescence, which may be detected by a detection objective, as described with reference to FIGS. 1 and 2.

At 940, the method 900 includes capturing, by a plurality of cameras, image data representative of fluorescence emitted by the illuminated portions of the sample. In an embodiment, each of the plurality of cameras may capture image data representative of fluorescence emitted by a respective one of the different portions of the sample in parallel, as described with reference to FIGS. 1-6. At 950, the method 900 includes moving the coverslip to a new location. In an embodiment, movement of the coverslip may cause additional portions of the sample to be illuminated by the plurality of beams of light, as described with reference to FIG. 2. As the coverslip is moved, different ones of the additional portions of the sample are illuminated in parallel by different ones of the plurality of beams of light, where the beams of light that illuminate adjacent ones of the additional portions of the sample are spatially separated (e.g., in an illumination direction and a detection direction) with respect to each other, as described with reference to FIGS. 1 and 2. As indicated by the arrow 952, after the cover slip is moved, at 950, the method 900 includes capturing, at 940, additional image data representative of fluorescence emitted by the additional locations of the sample (e.g., after the moving of the coverslip). In an embodiment, each of the plurality of cameras may capture image data representative of fluorescence emitted by a respective one of the additional portions of the sample in parallel, as described with reference to FIGS. 1 and 2. The coverslip may continue to be moved and additional image data may be captured until the sample has been completely imaged, or at least a portion of the sample that is of interest has been imaged. Once all of the image data has been captured, the method 900 includes, at 960, generating one or more images representative of the sample based on the captured image data. In an embodiment, the images may be generated as described with reference to FIGS. 1-6 (e.g., by fusing the image data from each of the plurality of cameras together to form a final image). In an embodiment, an image volume may be generated for each of the plurality of cameras, where, for a particular camera, the image volume comprises image data captured by the particular camera while the sample is at different locations, and the image volumes for each of the plurality of cameras may be combined to generate the final image of the sample. In an embodiment, the image volume may be a 3D data set comprising a series of 2D images generated based on the image data captured while the sample is positioned at various locations. In an embodiment, a 3D image of the entire sample may be generated by combining the 3D data sets generated for each of the cameras, as described with reference to FIGS. 5 and 6.

The method 900 may improve the image acquisition time for LSFM imaging systems, such as the imaging system 100 of FIG. 1, as described with reference to FIG. 4. Further, because of the decreased number of images per camera that are necessary to capture the entire volume, an imaging system according to embodiments may utilize longer exposure times while using lower intensity beams of light to illuminate the sample if desired. This may increase the useful life of the sample by reducing the effects of photobleaching, thereby enabling the sample to be observed (e.g., through imaging of the sample) for a longer period of time. Thus, embodiments of the present disclosure provide improvements to the technical field of microscope imaging systems, and further improve the functioning of the microscope imaging system itself (e.g., through faster image acquisition, reduced photobleaching, etc.).

As shown above, in embodiments, a cover slip mounted specimen may be moved and illuminated with a plurality of laterally and axially displaced one dimensional (1D) Gaussian light-sheets. Because the light-sheets are staggered in sample space, fluorescence from each light-sheet can be imaged orthogonally in a light-sheet fluorescence microscopy (LSFM) format with a second objective, separated in image space with mirrors (e.g., knife-edge mirrors), and independently detected on separate cameras. The three planes are thus imaged independently, and a complete three dimensional (3D) volume may be acquired by scanning the sample with a piezoelectric actuator through the three light-sheets. The illumination duty cycle for each 1D Gaussian light-sheet is 100%, which allows for both sensitive and delicate imaging of subcellular architectures.

By design, imaging according to embodiments is optimized for parallelized 3D imaging of adherent cells and monolayers with elongated, thin morphologies. Within a field of view extending approximately ~10 microns along the laser propagation axis (e.g., the Y-direction), which may be sufficient for imaging most mammalian cell types, approximately ~85% of the fluorescence captured by the objective from each image plane may be picked off with knife-edge mirrors and correctly imaged on the corresponding camera, as described above. Furthermore, the decreased image size afforded by the confined Y-dimension maximizes the image acquisition rate of a scientific CMOS cameras (e.g., 1603 frames per second for 128 pixels in the Y-dimension). Following registration of each sub-volume with fluorescent nanospheres, the data from each camera may be deconvolved, fused, and de-skewed, resulting in a ~3-fold increased image volume encompassing approximately ~130×20×100 microns (FIGS. 1D and E). The lateral resolution may be close to diffraction limited (~300 nm, full width half maximum, FWHM) for all three views after 10 iterations.

The axial resolution may be approximately ~600 nm FWHM for each view, which may be determined by the thickness of the illumination beam waist and the optical transfer function of the detection objective. The final 3D image is free of stitching related artifacts, and because there is negligible crosstalk between light-sheets, individual image planes exhibit excellent optical sectioning and are free of out-of-focus image blur.

Due to its light-efficient and spatially parallelized image acquisition, imaging systems of embodiments improve 3D microscopy by enabling 3-fold longer dwell times for a given volumetric image acquisition rate. Thus, embodiments may operate with 3-fold lower and longer illumination intensities and camera integration times, respectively, compared to conventional serial 3D image acquisition. As peak illumination intensity is one of the principal determinants in photobleaching and phototoxicity, embodiments provide a gentler illumination without sacrificing signal-to-noise or overall imaging speed. This may allow imaging of a migrating MDA-MB-231 breast cancer cell expressing GFP-Tractin for 1500 Z-stacks, without stereotypic signs of phototoxicity, which are often evident as alterations in cell morphology or initiation of cellular retraction. Thus, imaging systems and techniques of embodiments reduce photobleaching and phototoxicity effects on samples to be imaged.

For a given camera framerate, the volumetric image acquisition rate of an imaging system of embodiments may increase linearly with the degree of parallelization. This allows fast timescale biological events, including filopodial dynamics in an RPE cell, to be imaged with high spatiotemporal sampling. Despite the approximately ~3-fold increase in volumetric image acquisition rate, photobleaching is unaffected, since the same light dosage is delivered to the sample as in traditional LSFM. To demonstrate this, microtubule plus tips (+TIPs) with EB3-mNeonGreen in a layer of confluent U2OS osteosarcoma cells were imaged, and the imaging performance was compared to traditional single plane LSFM using the same exposure duration and illumination intensity. To quantify photobleaching, EB3 comets were automatically detected and their intensities measured through time in 3D with u-track. Imaging systems of embodiments provided a 2.7-fold increase in the volumetric image acquisition rate, while maintaining the same level of photobleaching as single plane LSFM. Thus, embodiments overcome both technological (maximum scanning speed) and photophysical (finite fluorescence photon flux) limitations of existing 3D microscopy, without compromising resolution, the size of the image volume, or introducing out-of-focus image blur.

To highlight the potential for rapid volumetric imaging, an imaging system according to embodiments was used to observe early endosomal trafficking in Rab5a-labeled cells. Retrograde trafficking of early endosomal Rab5a-positive vesicles is carried out by cytoplasmic dynein, a motor protein which in vitro achieves a processive motion of approximately ~1 micron per second. In vivo, early endosomes have been observed to translocate in short but linear bursts with velocities greater than 7 microns per second. However, these events have not been observed in 3D, since faithful measurement of active transport necessitates that temporal sampling increases with particle velocity, acceleration, and density. In ChoK1 cells, imaged at 2.92 Hz for 500 time points, rapid vesicular dynamics were observed. These included the fast translocation of vesicles from the basal to dorsal surface of the cell, which would otherwise be missed with two-dimensional widefield or confocal imaging.

This highlights the importance of imaging a cell in its entirety, as limitations in 2D imaging could lead to inaccurate biological conclusions. The vesicle translocation in RPE cells was further imaged for 400 time points at a volumetric image acquisition rate of 7.26 Hz, and, at this volumetric image acquisition rate, using automated particle detection and tracking, Rab5a-positive vesicles that exhibited retrograde transport with peak velocities beyond 10 microns per second were observed. It is believed that such fast vesicular movements have never been observed in 3D, possibly due to limitations in the volumetric image acquisition rate, a challenge overcome by imaging systems of embodiments. Biochemically, the activity and velocity of dynein is modulated through its association with adapter proteins and its cargo, perhaps pointing towards unknown effectors that 'supercharge' retrograde transport. This illustrates the potential of imaging systems of embodiments to measure rapid intracellular dynamics and to study biophysical phenomena in situ at the single particle level. Further, this points to challenges in in vitro reconstitution systems, where critical or unknown components may be omitted.

Figure 10:
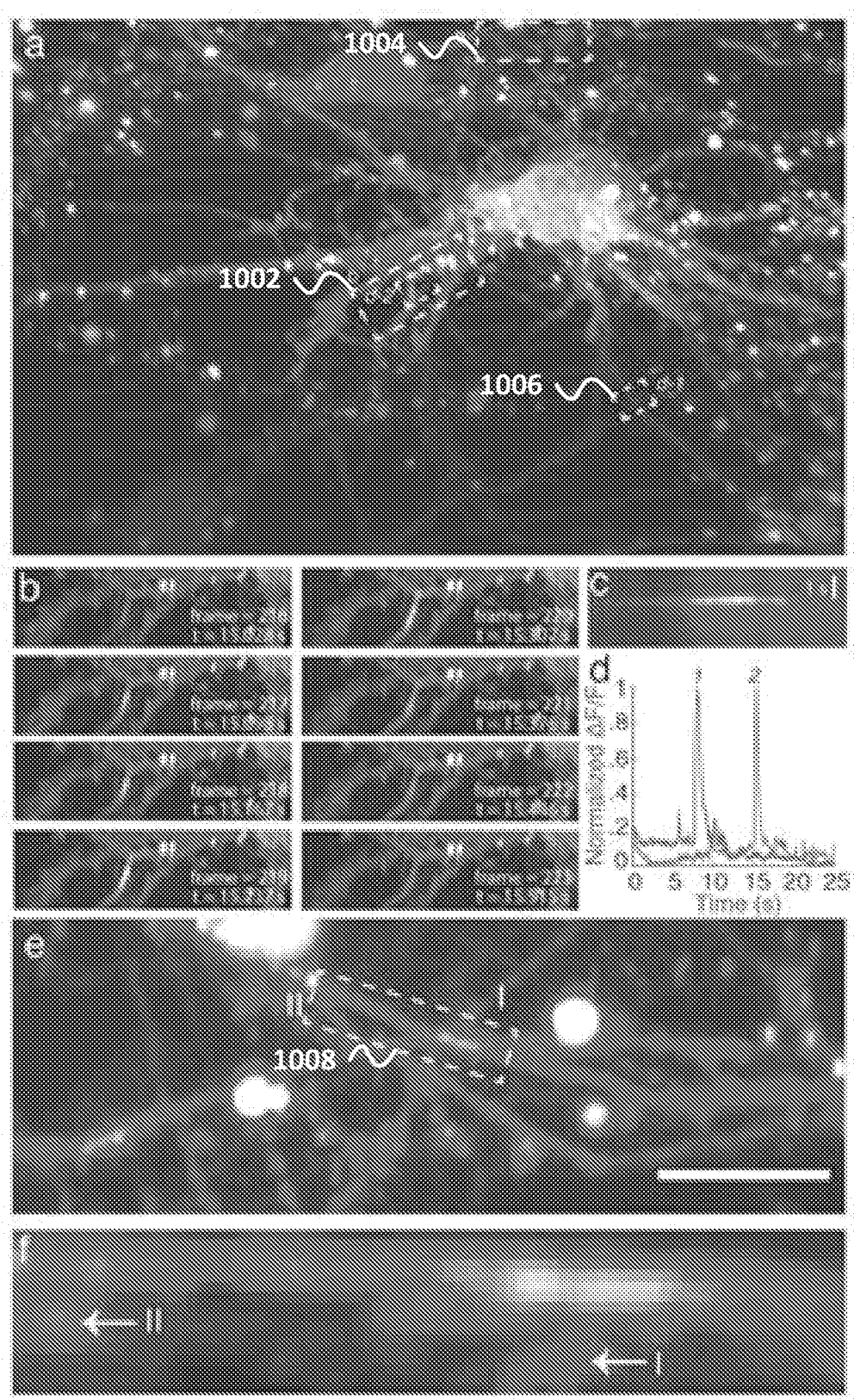
FIG. 10 is a diagram illustrating a plurality of images illustrating Calcium signaling in primary cortical neurons visualized with an imaging system configured according to embodiments.

Referring to FIG. 10, a plurality of images illustrating Calcium signaling in primary cortical neurons visualized with an imaging system configured according to embodiments are shown. Secondary messenger waves (e.g., Ca2+) propagate at great speeds through cells and organisms, thus necessitating fast image acquisition rates for proper temporal resolution. By overcoming the technical limitations associated with piezoelectric scanners (improved bandwidth at decreased scan amplitudes) and camera readout times (efficient use of camera parallelization), imaging systems of embodiments are capable of volumetrically imaging at 14 Hz, or approximately 2800 image planes per second. This enabled observation of calcium signals in dissociated primary cortical neurons labeled with GCaMP-6f over 400 time points, encompassing multiple neurons and their axonal and dendritic projections, as shown in FIG. 10 at "a". In image "a", a 3D rendering of primary cortical neurons, labeled with GCaMP-6f. Action potentials is shown. The neurons were volumetrically imaged at 14.37 Hz for 500 time points. A series of images "b" illustrate propagation of a calcium wave through a dendritic arbor, labeled 1002 in "a". Image "c" illustrates a Kymograph of action potential propagating along dendrite shown in "b". Image "d" illustrates temporal analysis of calcium bursts from regions 1002, 1004, 1006 specified in "a". Image "e" shows a dense, overlapping region of axonal projections from region specified in "a". Image "f" is a cross-section normal to the coverslip of region 1008 in "e", shown as a maximum intensity projection over a depth of 3.2 µm. In "f", arrows labeled "I" and "II" point at crossing dendrites that are also labeled in "e". Calcium waves propagated along dendrites (FIG. 10 at "b"), and dissipated asymmetrically in space and time (FIG. 10 at "c"). Because of the large field of view, individual firing events, evident as spikes in the intensity time traces, could be observed at sites distant from one another and could provide insight into dendritic multiplexing (FIG. 10 at "d"). Indeed, this is true even in thick, overlapping regions, which may be particularly important for quantifying signal propagation between synapses, and is not possible with 2D imaging modalities (FIG. 10 at "e" and "f").

Embodiments described above demonstrate a 3D parallelized imaging scheme that achieves for every image plane a performance that is comparable to a conventional single plane microscope. This has the important consequence that 3D imaging can be performed more delicately (i.e., with lower excitation intensities, thereby decreasing photodamage), with higher sensitivity, and with increased volumetric acquisition rates. Such improvements are necessary to image rapid subcellular processes with dimly labeled constituents, throughout the entire 3D volume of a cell. Initial experiments, as described above, have revealed rapid vesicular dynamics that were previously unobservable in 3D, and point towards exciting new research opportunities. For example, compared to other 3D imaging modalities, Rab5a-vesicles were approximately ~10 and 20-fold faster than EB3 comets and mitochondrial translocation events observed by Lattice LSFM and structured illumination microscopy, respectively.

In principle, imaging techniques of embodiments may be performed with a greater number of light-sheets (e.g., more light sheets than are illustrated and/or described with reference to FIGS. 1-10), allowing further improvements in parallelization. However, as light-sheets are positioned further away from the nominal focal planes of the excitation and detection objectives, aberration correction becomes increasingly important. An increase in spherical aberration for cameras 1 and 3, which were oppositely positioned approximately ~25 microns away from the detection objective's nominal focal plane may be observed. These aberrations may be effectively removed, and diffraction-limited imaging restored, by deconvolution with the corresponding point spread functions. Spherical aberration also decreased the peak intensity on both cameras by 24%. Importantly, this does not represent a loss of light, and could be corrected with deformable mirrors located in each light-sheet's conjugate pupil plane. This is in direct comparison to previous parallelization methods, where the introduction of a diffractive grating or spatial light modulator results in a 22% to 50% loss in total fluorescence intensity, respectively, and approximately ~66% of the remaining light is irrevocably lost to adjacent image planes as image blur. Thus, with existing methods, the in-focus fluorescence signal is diminished by up to 80% for an equivalent amount of 3D parallelization.

As described herein, FIGS. 1-10 illustrate embodiments that may be optimized for imaging adherent cells in a shallow volume adjacent to a coverslip. It is noted that the embodiments described above utilized mechanical scanning of the coverslip to develop and demonstrate the governing principles of embodiments, but such methods may become rate-limiting at volumetric image acquisition rates greater than 14 Hz. However, greater scan rates could be achieved with more-advanced piezo control systems. However, in a next generation embodiment of the method, mechanical cell movement may be replaced with an optical scan of the light-sheets along the coverslip, thus keeping cells stationary, as described in more detail below.

Figure 11:
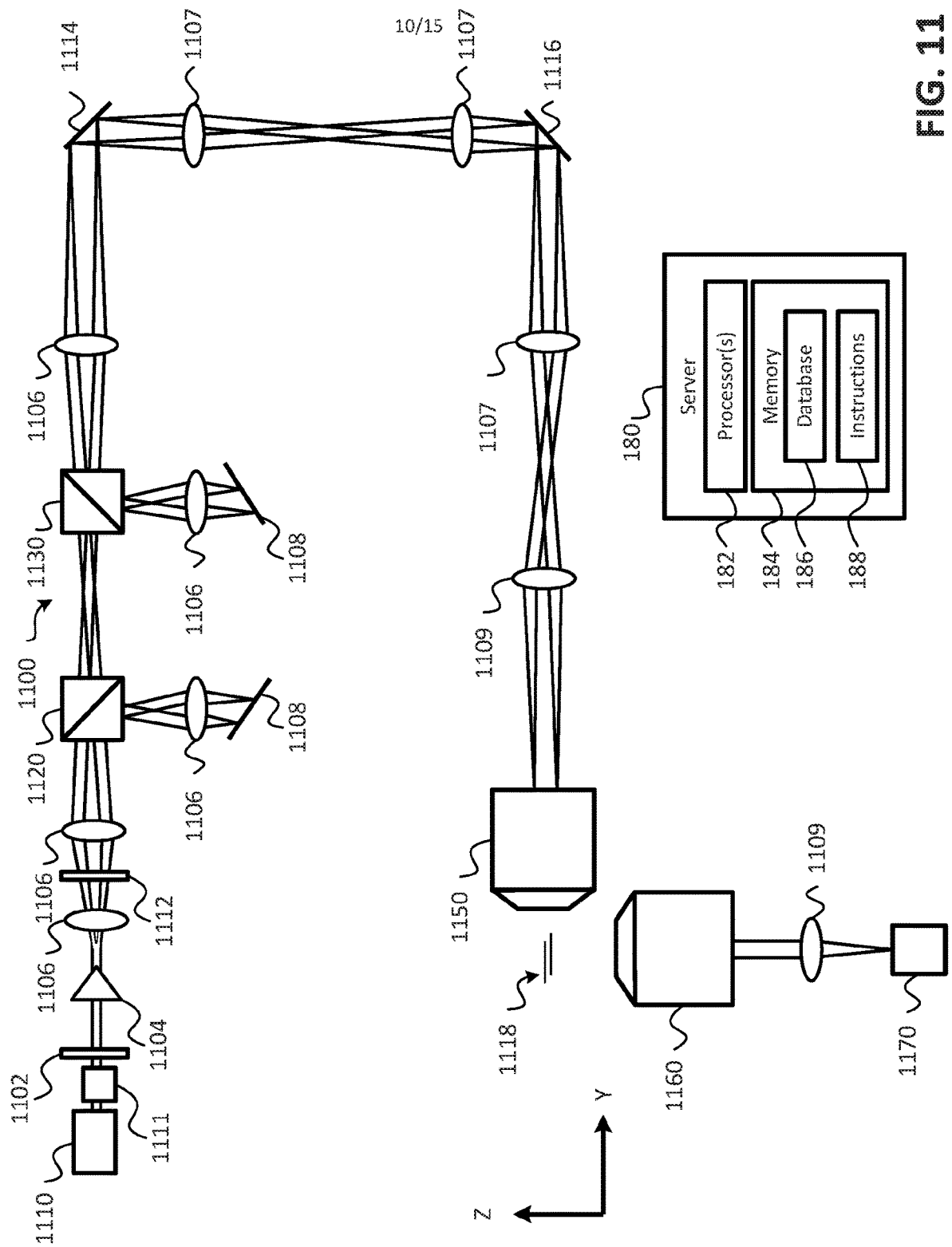
FIG. 11 is a block diagram illustrating another imaging system configured for parallelized image acquisition according to embodiments.

Referring to FIG. 11, a block diagram illustrating another imaging system configured for parallelized image acquisition according to embodiments is shown as an imaging system 1100. The imaging system 1100 includes a light source 1110. In embodiments, the light source 1110 may be a femtosecond pulsed 900 nm laser. Light emitted by the light source 1110 may be shuttered with an electro-optic modulator 1111, polarization rotated with a halfwave plate 1102, and shaped into a Bessel beam with an Axicon 1104. The Bessel beam may be spatially filtered with an annulus mask 1112. The Bessel beam may be split into two separate beams with a pair of polarizing beam splitters 1120, 1130, lenses 1106, and mirrors 1108. The two beams may be scanned with an X-Galvanometer 1114 and Z-Galvanometer 1116, which are relayed with scan lenses 1107 and a tube lens 1109 to the back focal plane of the excitation objective 1150. The resulting fluorescence is imaged at 90° in a light-sheet format with a detection objective (D.O.) 1160, tube lens 1109, and sCMOS camera 1170. As described above with reference to FIG. 1, the imaging system 1100 may be coupled to a server 180 configured to control operations of the imaging system 100 to acquire and/or generate 3D images of a sample. However, whereas in FIG. 1 the images correspond to a sample disposed on a cover slip, in the imaging system 1100, the sample may be disposed in a volume. Thus, the imaging system 1100 may enable imaging of a larger sample and/or imaging of samples that may not be suitable for imaging by the imaging system 100 of FIG. 1.

As described above, three-dimensional imaging of cells, tissues and organisms requires increasingly fast, sensitive, and delicate microscopy platforms such that high-speed cellular events (e.g., secondary messenger waves, intracellular transport, etc.) can be observed with Nyquist sampling in both space and time throughout large volumes. Light-sheet fluorescence microscopy (LSFM) according to embodiments, such as the imaging system 1100 of FIG. 11, may enable imaging of large volumes with high-resolution, high-sensitivity, and minimal phototoxicity. In LSFM, the illumination light is injected into a sample at 90° to the detection objective and fluorescence is imaged with a scientific camera, delivering approximately ~106 greater parallelization than laser scanning confocal microscopy. Further, because the illumination is confined within the depth of focus of the detection objective, the resulting image contains less out-of-focus image blur, and the photon burden placed upon the biological specimen is significantly reduced. Thus, a volumetric image may be collected by synchronously sweeping the light-sheet and detection objective in the Z-direction with a mirror galvanometer and piezoelectric actuator, respectively, and images of each plane are acquired serially.

The serial acquisition of 3D volumes remains a bottleneck due to technological (actuator speed) as well as photophysical (finite photon flux) limitations. Further, methods that image multiple planes simultaneously (e.g., with diffractive or refractive optical elements), or extend the detection objective depth of field (e.g., by introducing aberrations or point-spread function engineering), suffer from poor fluorescence collection efficiencies and increased image blur. To mitigate these challenges, the imaging system 100 of FIG. 1 provides cross-talk free imaging using a plurality of staggered light sheets, providing an increased volumetric acquisition rate of approximately ~14 Hz, and overcoming limitations in photon flux and detector technology. However, as explained above, the imaging system 100 of FIG. 1 may be restricted to imaging shallow volumes above a coverslip and may thus best suited for adherent cells. Nevertheless, there is widespread interest in imaging cells within more native tissue-like environments (e.g., synthetic hydrogels and extracellular matrix scaffolds) or within entire model organisms, for which the imaging system 100 of FIG. 1 may be ill-suited.

Figure 12A:
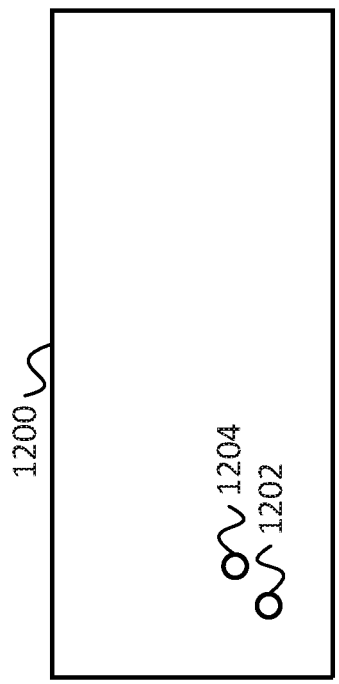
FIG. 12A is a block diagram illustrating a perspective view of illuminating a sample within a volume according to embodiments.
Figure 12B:
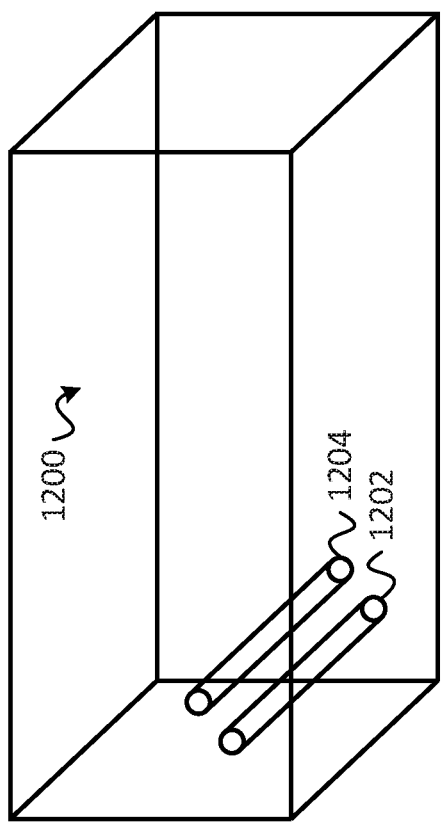
FIG. 12B is a block diagram illustrating a side view of illuminating a sample within a volume according to embodiments.
Figure 12C:
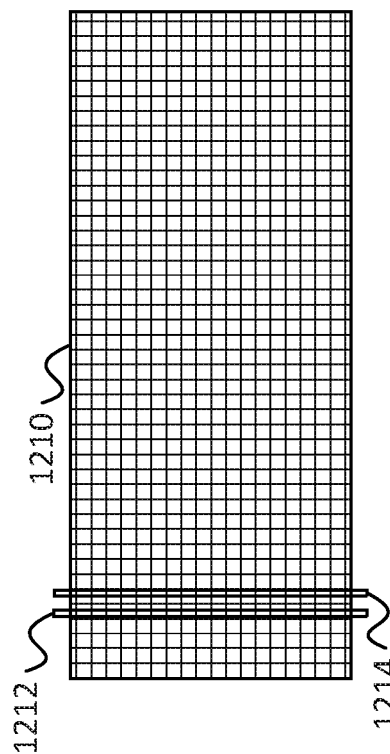
FIG. 12C is block diagram illustrating a technique for capturing image data representative of fluorescence emitted in response to illumination of portions of the volume by the pencils of light.

The imaging system 1100 of FIG. 11 provides for parallelization of digitally scanned light sheets. Importantly, the imaging system 1100 of FIG. 11 may be capable of parallelized imaging of large volumes (approximately ~100× 100×100 μm$^3$), with isotropic resolution, and minimal light losses and cross-talk. For example, and as shown in FIGS. 12A-12C, multiple laterally and axially staggered (relative to the detection objective, e.g., Y and Z dimensions) 2D illumination beams 1202, 1204, which may be Gaussian, Bessel, or other beams, may be used. With a single lateral scan of the illumination beams 1202, 1204, multiple light-sheets are spanned over different focal planes that reside within the depth of focus of the detection objective. Since the beams are laterally staggered and reside within the depth of focus of the detection objective, the fluorescence elicited from each beam is well focused and can be separated at any scan position. Therefore each image plane can be independently reconstructed with virtual confocal slit apertures. In FIGS. 12A-12B, two pencils of light 1202, 1204 are shown, which may be created by Bessel or Gaussian beams, and create two very thin light-sheets when they are scanned laterally through a volume 1200, where FIG. 12A is a block diagram illustrating a perspective view, and FIG. 12B is a side view of illumination beams at one particular scan position. FIG. 12C illustrates a technique for capturing image data representative of fluorescence emitted in response to illumination of portions of the volume by the pencils of light 1202, 1204. As shown in FIG. 12C, image data corresponding to a first set of pixels 1212 and a second set of pixels 1214 within an imaging space 1210 may be captured by a camera (e.g., the camera 1170 of FIG. 11), where the imaging space 1210 corresponds to all pixels that may be imaged by the camera. The active pixels 1212 may correspond to fluorescence detected in response to illumination of the sample by the pencil of light 1202, and the active pixels 1214 may correspond to fluorescence detected in response to illumination of the sample by the pencil of light 1204. The image data may be used to generate three dimensional images of a sample within the volume 1200, as described in more detail below. It is noted that in embodiments, the imaging system 1100 may utilize a greater number of illumination beams (e.g., greater than two pencils of light), allowing further improvements in parallelization, as well as thicker beams, which are typically employed for light-sheet imaging of developmental processes.

Figure 13:
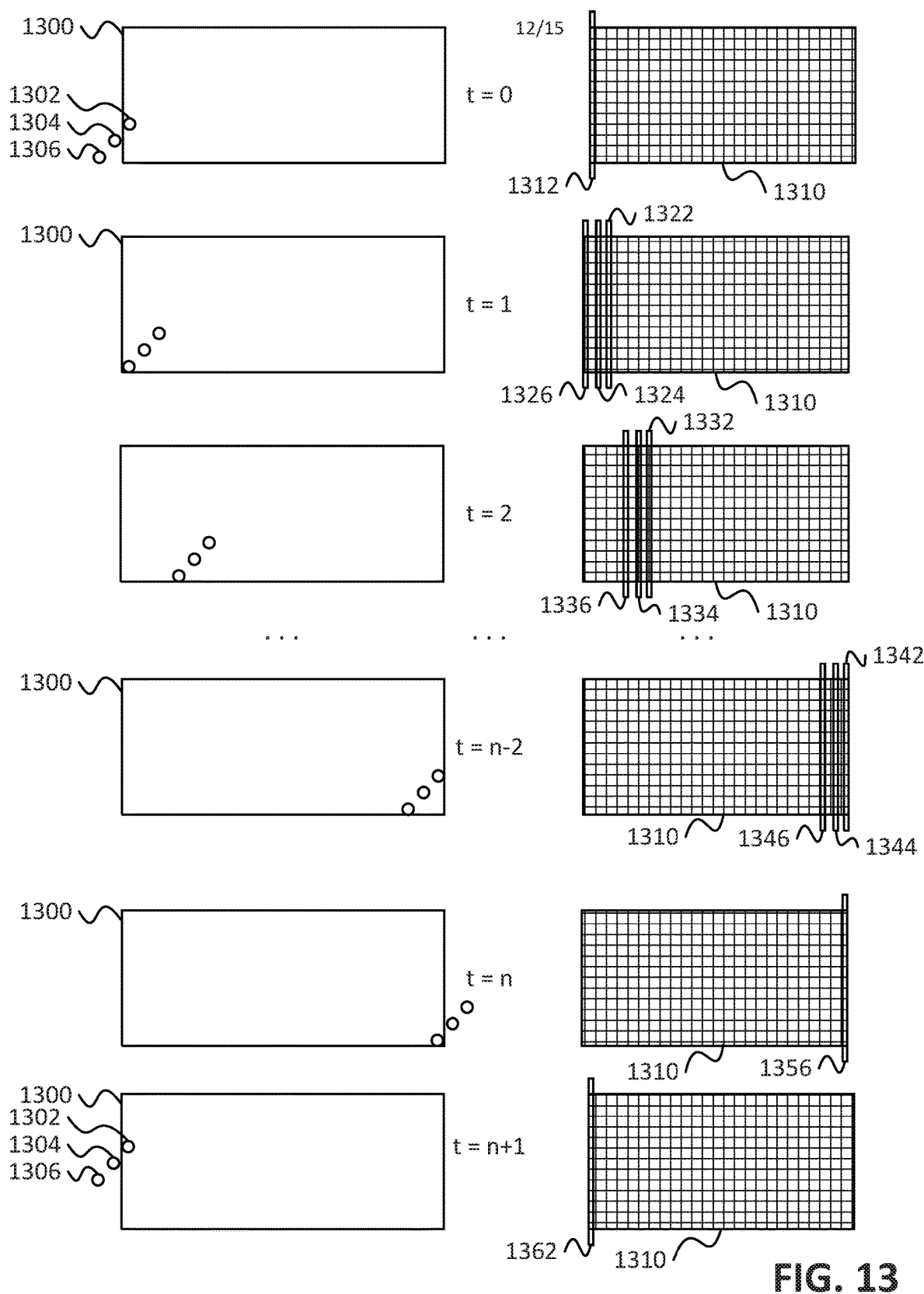
FIG. 13 is a block diagram illustrating a process for imaging a volume in accordance with embodiments.

Referring to FIG. 13, a block diagram illustrating a process for imaging a volume in accordance with embodiments is shown. In an embodiment, the process illustrated in FIG. 13 may be performed by the system 1100 of FIG. 11 under control of the server 180 of FIG. 11. As shown in FIG. 13, a volume 1300 may be imaged using a plurality of pencils of light, 1302, 1304, 1306, where the pencils of light are staggered with respect to each other. The imaging process may start at a time t=0, where only a single pencil of light (e.g., the pencil of light 1302) illuminating the volume 1300. At time t=0, a camera (e.g., the camera 1170 of FIG. 11) may capture image data representative of fluorescence emitted by a sample within the volume 1300. For example, the camera may capture image data within a pixel space 1310 using active pixels 1312. Subsequent to acquiring the image data, the pencils of light may be swept across the volume and additional image data may be captured. For example, at a time t=1, the pencils of light 1302, 1304, 1306 may be swept across the sample such that all of the pencils of light are illuminating the volume 1300. At time t=1, the camera may capture image data representative of fluorescence from each of the pencils of light using active pixels within the pixel space 1310. For example, image data representative of the fluorescence caused by illumination of the volume by the pencil of light 1302 may be captured using active pixels 1322, image data representative of the fluorescence caused by illumination of the volume by the pencil of light 1304 may be captured using active pixels 1324, and image data representative of the fluorescence caused by illumination of the volume by the pencil of light 1306 may be captured using active pixels 1326.

After capturing the image data at time t=1, the pencils of light may be swept further across the volume, as shown at time t=2, and additional image data may be captured. For example, at time t=2, image data representative of the fluorescence caused by illumination of the volume by the pencil of light 1302 may be captured using active pixels 1332, image data representative of the fluorescence caused by illumination of the volume by the pencil of light 1304 may be captured using active pixels 1334, and image data representative of the fluorescence caused by illumination of the volume by the pencil of light 1306 may be captured using active pixels 1336. At time t=n−2, the pencil of light 1302 may be located proximate a boundary of the volume 1300 and additional image data may be captured by the camera. For example, image data representative of the fluorescence caused by illumination of the volume by the pencil of light 1302 may be captured using active pixels 1342, image data representative of the fluorescence caused by illumination of the volume by the pencil of light 1304 may be captured using active pixels 1344, and image data representative of the fluorescence caused by illumination of the volume by the pencil of light 1306 may be captured using active pixels 1346. Subsequently, the pencils of light may be swept further across the volume until only the pencil of light 1306 is illuminating the volume, as shown at time t=n. At time t=n, the camera may capture image data representative of the fluorescence caused by illumination of the volume by the pencil of light 1306 may be captured using active pixels 1356. After time t=n, image data representative of fluorescence emitted by the sample within the volume 1300 that has been captured by the camera may represent three slices of the sample (one slice corresponding to each pencil of light). To generate an image of the entire volume 1300, the pencils of light may be moved to a non-imaged portion of the volume, as shown at time t=n+1, and the process may start over. For example, at time t=n+1, image data may be captured using active pixels 1362 of the pixel space 1310, and subsequently the pencils of light may be swept across the volume 1300, capturing image data as described above.

After the entire volume 1300 has been imaged, the image data may be used to reconstruct a 3D image of the sample within the volume. For example, image data corresponding to fluorescence emitted in response to illumination by the pencil of light 1302, such as the image data captured in active pixels 1312, 1322, 1332, 1342, etc. may be used to generate a 2D image of a first slice of the sample within the volume (e.g., a slice illuminated by the pencil of light 1302), the image data captured in active pixels 1324, 1334, 1344, etc. may be used to generate a 2D image of a second slice of the sample within the volume (e.g., a slice illuminated by the pencil of light 1304), and the image data captured in active pixels 1326, 1336, 1346, 1356, etc. may be used to generate a 2D image of a third slice of the sample within the volume (e.g., a slice illuminated by the pencil of light 1306). Additional 2D images of slices of the sample may be generated using image data captured subsequent to time t=n. The 2D image slices may then be combined to generate a final three dimensional image of the sample. By capturing image data from each pencil of light in parallel, the sample may be imaged more quickly. Further, as explained above, because the pencils of light are staggered, out of focus blur may be reduce, improving the quality of the resulting 3D images.

Figure 14:
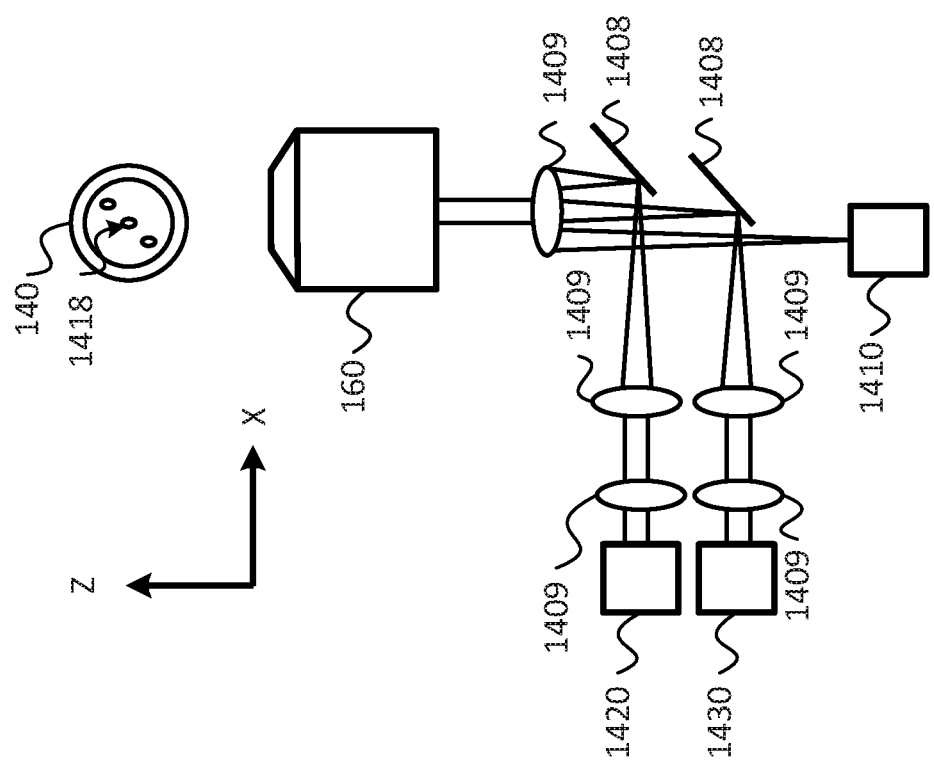
FIG. 14 is an additional embodiment of a configuration for imaging components of an imaging system according to embodiments.

Referring to FIG. 14, an additional embodiment of a configuration for imaging components of an imaging system according to embodiments is shown. In an embodiment, the configuration of the imaging components shown in FIG. 14 may be utilized by the imaging system 1100 of FIG. 11. As shown in FIG. 14, the imaging components include a first camera 1410, a second camera 1420, and a third camera 1430. It is noted that the view shown in FIG. 14, illustrates the pencils of light 1418 and the excitation objective 140 using an ZX view, whereas the configuration illustrated in FIG. 11 illustrates a ZY view). In the embodiment illustrated in FIG. 14, tube lenses 1409 and mirrors 1408 may be used to image fluorescence caused by illumination of a sample within a volume onto an imaging plane of one of the cameras 1410, 1420, 1430. Thus, each camera only captures image data corresponding to one of the pencils of light 1418. This may speed up the imaging process, as compared to the configuration illustrated in FIGS. 11-13, since image data does not have to be stitched together, and may simplify the imaging process since tracking which image data/pixels correspond to which pencil of light may not be necessary. In this scheme, the images of each pencil of light may need to remain stationary in image space, such that they can be picked up by fixed (e.g., non-moving) mirrors. The lateral scan through the sample may be accomplished by either scanning the sample physically through the stationary pencils of light 1418 or by optically scanning the pencils of light 1418 through the sample. In the latter case, the images of the pencils of light 1418 may be descanned with a galvanometric mirror to make them stationary (non-moving) on the mirrors 1408.

Figure 15:
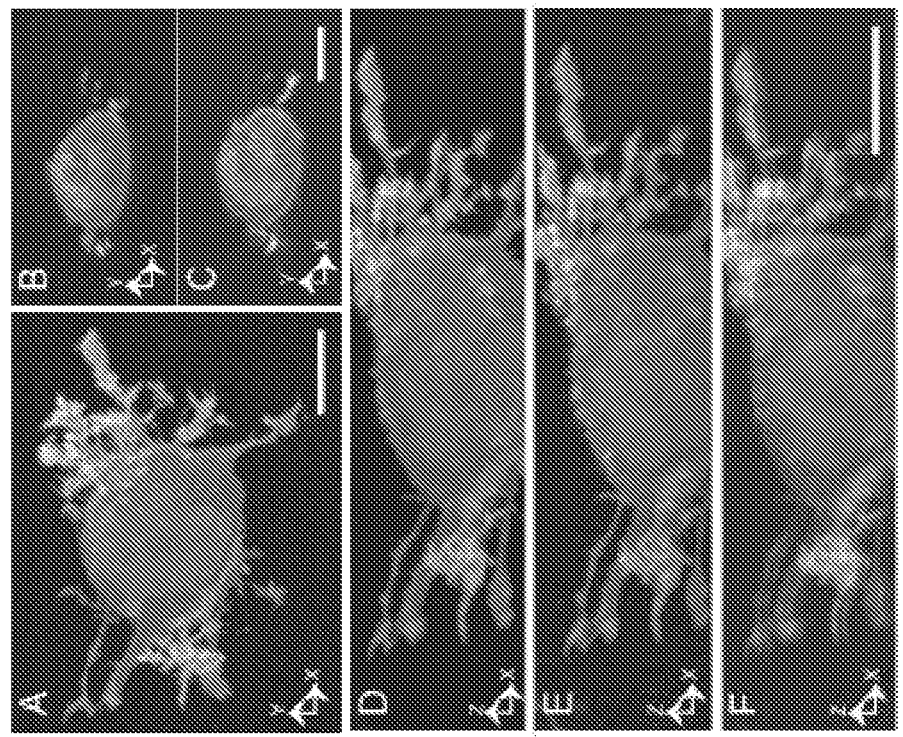
FIG. 15 is a diagram illustrating breast cancer cells imaged using an imaging system configured according to embodiments.

To demonstrate the ability of imaging systems, such as the imaging system 1100 illustrated and described with reference to FIG. 11, to perform high-quality simultaneous two focal plane microscopy, an invasive population of breast cancer cells in an approximately ~4 mg/mL collagen I extracellular matrix were imaged. The cells were labeled with AktPH, a GFP translocation biosensor that binds to phosphatidyl-inositol-3,4,5-trisphosphate (PIP3) and reports on local phosphoinositide-3-kinase (PI3K) activity, which is often aberrantly regulated in breast cancer. The axial spacing between the two beams was set to 800 nm, which is well within the depth of focus of the detection objective (e.g., an NA 0.8 detection objective), but large enough to show a clear visual difference between the two focal planes. A 3D stack with an axial step size of 160 nm was acquired to obtain Nyquist sampled datasets of the cell from each illumination beam. Referring to FIG. 15, images of the breast cancer cells described above are shown. Image "A" of FIG. 15 shows a maximum intensity projection in the lateral dimension obtained with a single illumination beam. Images "B" and "C" of FIG. 15 show individual XY cross-sections that were imaged simultaneously by the two beams. In images "B" and "C" of FIG. 15 it is clearly seen that the two beams imaged different parts of the cell, and that both images deliver an excellent level of detail, including filopodia and small organelles that were negatively stained by the cytosolic GFP signal. Images "D" and "E" of FIG. 15 show axial maximum intensity projections of image volumes obtained from each beam, both of which offer excellent optical sectioning and axial resolution. Image "F" of FIG. 15 shows an overlay of the two axial maximum intensity projections, which were axially shifted to one another by the beam separation of 800 nm, but otherwise deliver good correspondence of the imaged cellular structures.

Figure 16:
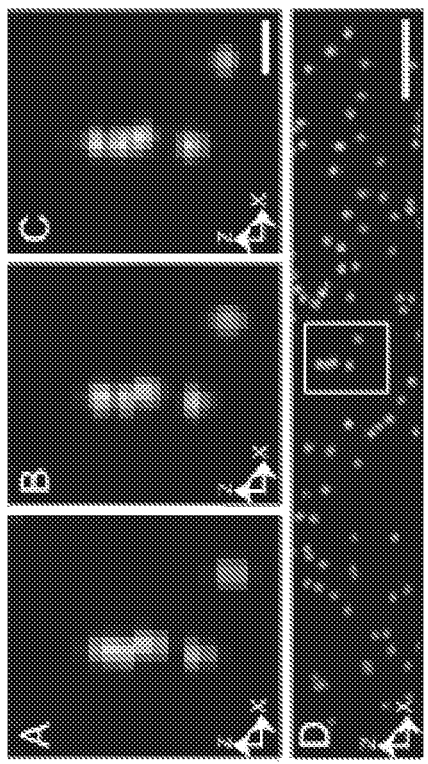
FIG. 16 is a diagram illustrating sub-diffraction nanospheres imaged using an imaging system of embodiments.

To further demonstrate the parallelized imaging capabilities of the imaging system 1100 of FIG. 11, illumination beams were strategically separated axially by 162 nm and used to acquire a Z-stack of sub-diffraction nanospheres with a 320 nm step size. Referring to FIG. 16, images of sub-diffraction nanospheres captured using an imaging system of embodiments are shown. In embodiments, the images shown in FIG. 16 were captured using the imaging system 1100 of FIG. 11. The axial resolution of the imaging system was configured to approximately ~350 nm and images of each beam were under sampled in the axial direction resulting in clusters of beads that were not resolvable and isolated beads that were clearly under sampled in the Z-direction, as shown in image "A" of FIG. 16. However, by interlacing the data acquired from the two illumination beams, proper Nyquist sampling was restored, and individual beads became more clearly distinguished, as shown in image "B" of FIG. 16. Further, the interlaced data was in good agreement with data acquired conventionally with proper axial sampling and a single illumination beam, as shown in image "C" of FIG. 16, and interlaced data quality was maintained throughout large field of views, as shown in image "D" of FIG. 16. Because the number of images acquired was decreased by the extent of parallelization (N=2), the image stack was acquired approximately ~2× faster than what would otherwise be possible with a single beam. Thus, embodiments of the imaging system described with reference to FIGS. 11-17 demonstrate an improved imaging capability compared to traditional imaging techniques.

Figure 17:
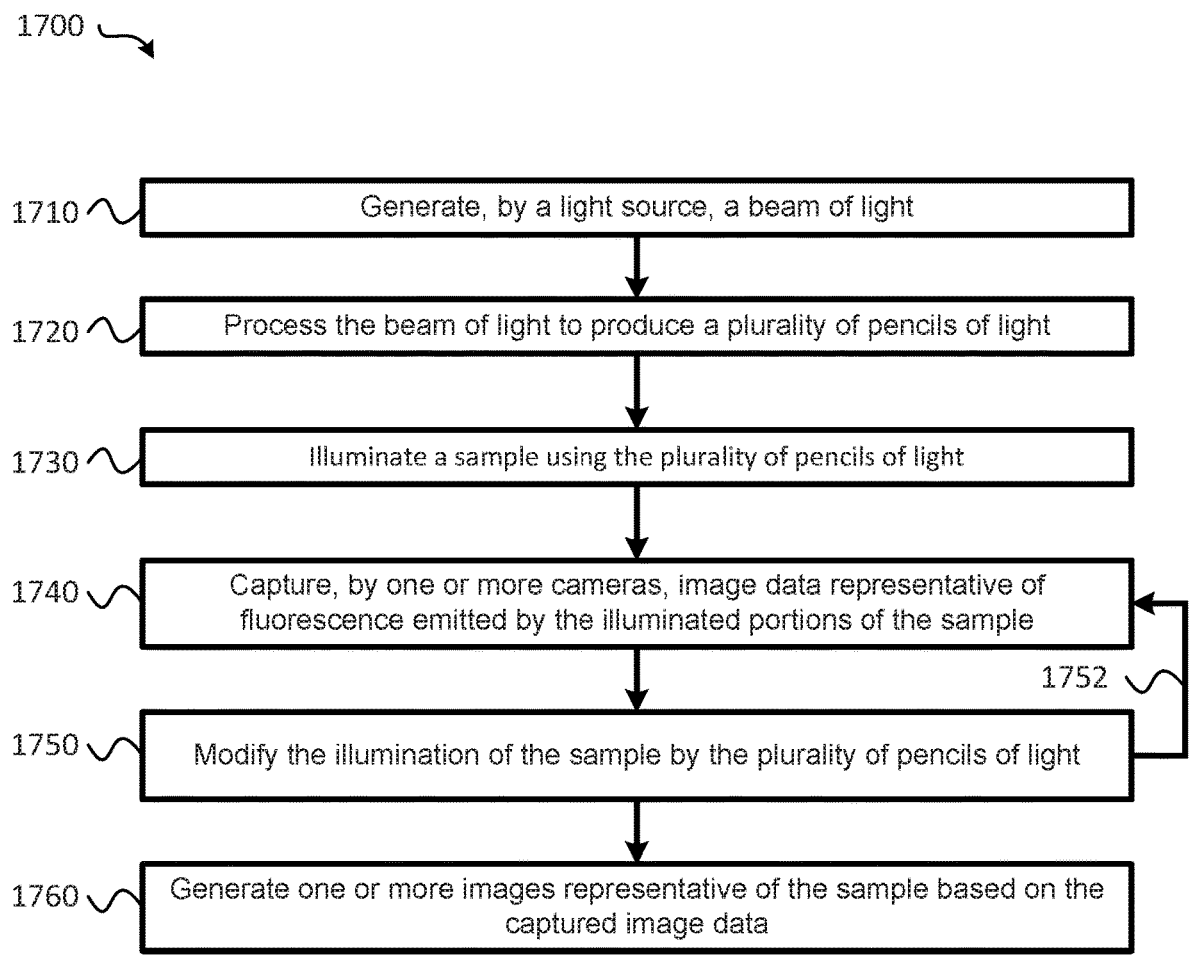
FIG. 17 is a flow diagram of a method for performing parallelized image acquisition with reduced photo-bleaching and blurring of a sample within a volume in accordance with embodiments.

Referring to FIG. 17, a flow diagram of a method for performing parallelized image acquisition with reduced photo-bleaching and blurring of a sample within a volume in accordance with embodiments is shown as a method 1700. In embodiments, the method 1700 may be performed using the imaging system 1100 of FIG. 11. In additional or alternative embodiments, the method 1700 may be performed using the imaging system 1100 of FIG. 11 modified to include the imaging configuration illustrated with respect to FIG. 14. In embodiments, the method 1700 may be stored as instructions (e.g., the instructions 188 of FIG. 11) executable by a processor (e.g., the processor(s) 182 of FIG. 11) to control the imaging system 1100 to generate one or more three dimensional images of a sample within a volume.

At 1710, the method 1700 includes generating, by a light source, a beam of light. In embodiments, the light source may be the light source 1110 of FIG. 11. At 1720, the method 1700 includes processing the beam of light to produce a plurality of pencils of light. In embodiments, the processing of the beam of light may include shuttering the light emitted by the light source, using the electro-optic modulator 1111 of FIG. 11, for example. Further, processing of the pencils of light may include rotating polarization of the pencils of light, using the halfwave plate 1102 of FIG. 11, for example, and shaping the beam of light into a Bessel beam, using the Axicon 1104 of FIG. 11, for example. The Bessel beam may be spatially filtered, using the annulus mask 1112 of FIG. 11, for example, and then split into two or more separate beams, using the polarizing beam splitters 1120, 1130, the lenses 1106 of FIG, and the mirrors 1108 of FIG. 11, for example. In a different embodiment, beam splitting maybe achieved using a diffractive optical element. The two beams may then be scanned, using the X-Galvanometer 1114 and Z-Galvanometer 1116 of FIG. 11, for example, and then relayed, using the scan lenses 1107 and the tube lens 1109 of FIG. 11, for example, to the back focal plane of an excitation objective, such as the excitation objective 1150 of FIG. 11, to illuminate, at 1730, the sample using the plurality of pencils of light. As explained above, the sample may be disposed within a volume, and the plurality of pencils of light may staggered such that different portions of the sample are illuminated in parallel by a different one of the plurality of pencils of light, as described and illustrated with reference to FIGS. 12 and 13. Further, the pencils of light that illuminate adjacent portions of the sample may be spatially separated with respect to each other, as described and illustrated with reference to FIGS. 12 and 13.

At 1740, the method 1700 includes capturing, by one or more cameras, image data representative of fluorescence emitted by the illuminated portions of the sample. In embodiments, the resulting fluorescence may be imaged at 90° in a light-sheet format, using the detection objective 1160, tube lens 1109, and sCMOS camera 1170, as shown in FIG. 11. In embodiments, the one or more cameras may include a single camera, as shown in FIG. 11. In such a configuration the method 1700 may further include capturing, by the single camera, the image data representative of fluorescence emitted by the illuminated portions of the sample. For each of the plurality of the plurality of pencils of light, the single camera may be configured to capture image data representative of fluorescence emitted by the sample in response to illumination by the plurality of pencils of light in parallel, where fluorescence emitted by the sample in response to illumination by one of the plurality of pencils of light is mapped to first active pixels of the camera, and where fluorescence emitted by the sample in response to illumination by another one of the plurality of pencils of light is mapped to second active pixels of the camera, as described and illustrated with reference to FIGS. 11-13. The image data may then be correlated such that image data corresponding to a particular one of the plurality of pencils of light may be used to generate one or more images representative of the sample based on the captured image data, and where each of the one or more images corresponds to fluorescence emitted by the sample in response to illumination by a respective one of the plurality of pencils of light, as described and illustrated with reference to FIGS. 12 and 13. For example, as described above with reference to FIG. 13, image data corresponding to the pencil of light 1302 may be captured at different times at active pixels 1312, 1322, 1332, 1342 (and other active pixel sets not shown in FIG. 13) during a single sweep of the pencils of light across the volume, and the image data for pencil of light 1302 may be used to generate an image corresponding to a portion of the sample illuminated by the pencil of light 1302 during the sweep. Additional images may be generated for the fluorescence caused by illumination by the pencils of light 1304 and 1306 in a similar manner.

In another embodiment, the image detection components may be configured in the manner illustrated in FIG. 14, where different cameras are used, where each camera captures image data for a respective one of the pencils of light. For example, the one or more cameras may include two or more cameras, and the method may include capturing, by a first camera of the two or more cameras, first image data representative of fluorescence emitted by a first portion of the sample in response to illumination by a first one of the plurality of the plurality of pencils of light, and capturing, by a second camera of the two or more cameras, second image data representative of fluorescence emitted by a second portion of the sample in response to illumination by a second portion of the sample by a second pencil of light of the plurality of the plurality of pencils of light. At least a portion of the first image data and the second image data is captured in parallel (e.g., depending on whether the pencil of light is illuminating the volume or not, as shown in FIG. 13). In such an embodiment, one or more images may be generated based on image data captured by each of the two or more cameras. For example, a first image of the one or more images may be generated based on image data captured by the first camera, and a second image of the one or more images may be generated based on image data captured by the second camera. Because each camera only captures image data for a single pencil of light, processing of the image data to generate the images may be simplified and/or faster.

At 1750, the method 1700 include modifying the illumination of the sample within the volume using the plurality of pencils of light, and, as indicated by arrow 1752, additional image data may be captured by the one or more cameras subsequent to modifying the illumination of the sample. In embodiments, modifying the illumination of the sample within the volume may include sweeping the plurality of pencils of light across the volume in a first direction, as shown in FIG. 13 above. In embodiments, the sweeping of the pencils of light may be performed by controlling one or more galvanometers to facilitate the sweeping of the plurality of pencils of light in the first direction. In embodiments, modifying the illumination of the sample within the volume may further comprise modifying a location of the plurality of pencils of light in a second direction to illuminate additional portions of the sample within the volume, which may accomplished by controlling the one or more galvanometers to facilitate the modifying of the location of the plurality of pencils of light in the second direction. For example, the pencils of light may be swept across the volume in the first direction to facilitate imaging of a first portion of the sample/volume, and then the pencils of light may be modified in the second direction prior to performing another sweep of the pencils of light in the first direction to facilitate imaging of a second portion of the sample/volume. In this manner, the entire sample/volume may be imaged. After the entire sample/volume of interest has been illuminated, the method 1700 may include combining the images generated based on the image data captured by one or more cameras to generate a three dimensional image of the sample within the volume.

The embodiments described with reference to FIGS. 11-17 provide for 3D parallelization of digitally scanned light sheet microscopes without introducing noticeable cross talk or light losses. Further, it has been shown that embodiments provide for faster image acquisition due to the parallelized image acquisition, however, it is noted that the performance improvement or speed of the image acquisition may not necessarily be "x" times the number of pencils of light used because there may be instances where portions of the sample are not illuminated by all pencils of light due to the staggered configuration of the pencils of light, as shown in FIG. 13 at time t=0 and t=n, for example. Further, it is noted that although embodiments are described as utilizing two or three pencils of light, imaging systems of embodiments are not limited to this number of illumination sources. Rather, embodiments contemplate imaging system utilizing two, three, or more than three pencils of light. Thus, the aspects of the embodiments illustrated and described with reference to FIGS. 11-17 present a concept for parallelization of a light sheet fluorescence microscope that enables significant improvements in the volumetric acquisition rate while not compromising axial resolution, optical sectioning or sensitivity. This progress is needed as life scientists transition from optical coverslips to more complex 3D environments, where speed, resolution, and sensitivity are critical imaging attributes for biological discovery.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the methods and systems are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A method for performing parallelized image acquisition with reduced photo-bleaching and blurring, the method comprising:
    generating, by a light source, a beam of light;
    splitting the beam of light to produce a plurality of beams of light each having an equal power, the equal power of each of the plurality of beams of light being less than a power of the beam of light generated by the light source;
    illuminating a sample disposed on a coverslip using the plurality of beams of light, the coverslip oriented such that different portions of the sample are each illuminated in parallel by a different one of the plurality of beams of light, with adjacent portions of the sample being illuminated by adjacent beams of light of the plurality of beams of light that are spatially separated with respect to each other;
    capturing, by a plurality of cameras, image data representative of fluorescence emitted in response to the illuminating of the sample, each of the plurality of cameras capturing corresponding image data representative of fluorescence emitted by a respective one of the different portions of the sample in parallel; and
    generating one or more images representative of the sample based on the image data.

2. The method of claim 1, wherein the plurality of beams of light includes at least a first beam of light and a second beam of light, and the plurality of cameras comprises at least a first camera and a second camera.

3. The method of claim 2,
    wherein,
        the first camera captures first image data representative of fluorescence emitted by a first portion of the sample that has been illuminated by the first beam of light, and
        the second camera captures second image data representative of fluorescence emitted by a second portion of the sample that has been illuminated by the second beam of light.

4. The method of claim 1, wherein, during the illuminating of the sample, each of the adjacent beams of light of the plurality of beams of light is spatially separated from each other by a threshold distance.

5. The method of claim 1,
    wherein
        the coverslip is oriented at an angle with respect to an illumination objective and a detection objective,
        the illumination objective is configured to illuminate the different portions of the sample using the plurality of beams of light, and
        the detection objective is configured to detect the fluorescence emitted in response to the illuminating.

6. The method of claim 1, further comprising:
    moving the coverslip to a new location, where movement of the coverslip causes additional portions of the sample to be illuminated by the plurality of beams of light, different ones of the additional portions of the sample being illuminated in parallel by corresponding different ones of the plurality of beams of light, adjacent ones of the additional portions of the sample being illuminated by corresponding adjacent beams of light of the different ones of the plurality of beams of light that are spatially separated with respect to each other;
    capturing additional image data representative of fluorescence emitted by the additional portions of the sample, each of the plurality of cameras capturing corresponding additional image data representative of fluorescence emitted by a respective one of the additional portions of the sample in parallel; and
    generating one or more additional images representative of the additional image data.

7. The method of claim 6, further comprising:
    generating a three-dimensional (3D) data set for each camera of the plurality of cameras, the 3D data set for each camera comprising a series of two-dimensional (2D) images generated based on the image data captured while the sample is at an initial position and the additional image data captured after the sample has been moved to one or more additional locations, the one or more additional locations including the new location.

8. The method of claim 7, further comprising:
    generating a 3D image of the sample by combining the 3D data sets generated for the plurality of cameras.

9. An imaging system for performing parallelized image acquisition with reduced photo-bleaching and blurring, the imaging system comprising:
    a light source to generate a beam of light;
    one or more beam splitters configured to produce a plurality of beams of light each having an equal power, the equal power of each of the plurality of beams of light being less than a power of the beam of light generated by the light source;
    an illumination objective to illuminate a sample using the plurality of beams of light, the sample being disposed on a coverslip;
    a detection objective to detect fluorescence emitted by the sample, the coverslip being oriented such that different portions of the sample are each illuminated in parallel by a different one of the plurality of beams of light in a staggered configuration, such that adjacent portions of the sample are illuminated by adjacent beams of light of the plurality of beams of light, the adjacent beams of light being spatially separated with respect to each other along a detection direction;
    a plurality of cameras configured to capture image data representative of the fluorescence emitted by the sample as detected by the detection objective, each of the plurality of cameras configured to capture corresponding image data representative of fluorescence emitted by a respective one of the different portions of the sample in parallel; and
    at least one processor to generate one or more images representative of the sample based on the image data.

10. The imaging system of claim 9, wherein the plurality of beams of light includes at least a first beam of light and a second beam of light, and the plurality of cameras comprises at least a first camera and a second camera, the first camera configured to capture first image data representative of fluorescence emitted by a first portion of the sample that has been illuminated by the first beam of light, and the second camera configured to capture second image data representative of fluorescence emitted by a second portion of the sample that has been illuminated by the second beam of light, the first portion and the second portion of the sample are staggered with respect to each other.

11. The imaging system of claim 9,
wherein,
the coverslip is oriented at an angle with respect to the illumination objective and the detection objective, and
the angle is forty five degrees (45°) and provides the staggered configuration.

12. The imaging system of claim 9,
wherein,
the coverslip is movable to a new location,
movement of the coverslip causes additional portions of the sample to be illuminated by the plurality of beams of light,
different ones of the additional portions of the sample are illuminated in parallel by corresponding different ones of the plurality of beams of light,
adjacent ones of the additional portions of the sample are illuminated by corresponding adjacent beams of light of the different ones of the plurality of beams of light that are spatially separated with respect to each other,
the plurality of cameras is configured to capture corresponding additional image data representative of fluorescence emitted by the additional portions of the sample.

13. The imaging system of claim 12, wherein the image data and the additional image data are stored in memory, and the at least one processor is configured to:
generate a three-dimensional (3D) data set for each camera of the plurality of cameras, the 3D data set for each camera comprising a series of two-dimensional (2D) images generated based on the image data captured while the sample is at an initial position and the additional image data captured after the sample has been moved to one or more additional locations, the one or more additional locations including the new location; and
generate a 3D image of the sample by combining the 3D data sets generated for the plurality of the cameras.

14. A method for performing parallelized image acquisition with reduced photo-bleaching and blurring, the method comprising:
generating, by a light source, a beam of light;
processing the beam of light to produce a plurality of pencils of light;
illuminating a sample using the plurality of pencils of light, the sample being disposed within a volume, the plurality of pencils of light being staggered such that different portions of the sample are each illuminated in parallel by a different one of the plurality of pencils of light, with adjacent portions of the sample being illuminated by adjacent pencils of light of the plurality of pencils of light that are spatially separated with respect to each other;
capturing, by one or more cameras, image data representative of fluorescence emitted in response to the illuminating of the sample, each of the one or more cameras capturing corresponding image data representative of fluorescence emitted by a respective one of the different portions of the sample in parallel;
modifying the illuminating of the sample within the volume using the plurality of pencils of light, additional image data being captured by the one or more cameras subsequent to modifying the illuminating of the sample; and
generating one or more images representative of the sample based on the image data and the additional image data.

15. The method of claim 14, wherein the modifying of the illuminating of the sample within the volume includes:
sweeping the plurality of pencils of light across the volume in a first direction; and
controlling one or more galvanometers to facilitate the sweeping of the plurality of pencils of light across the volume in the first direction.

16. The method of claim 15, wherein the modifying of the illuminating of the sample within the volume includes:
modifying a location of the plurality of pencils of light in a second direction to illuminate additional portions of the sample within the volume; and
controlling the one or more galvanometers to facilitate the modifying of the location of the plurality of pencils of light in the second direction.

17. The method of claim 14, where the one or more cameras comprises a single camera, the method further comprising:
capturing, by the single camera, the image data representative of the fluorescence emitted in response to the illuminating of the sample, for each of the plurality of the plurality of pencils of light, the single camera being configured to capture the image data representative of the fluorescence emitted by the sample in response to illumination by the plurality of pencils of light in parallel, first corresponding fluorescence emitted by the sample in response to illumination by one of the plurality of pencils of light being mapped to first active pixels of the single camera, and second corresponding fluorescence emitted by the sample in response to illumination by another one of the plurality of pencils of light being mapped to second active pixels of the single camera;
correlating image data corresponding to a particular one of the plurality of pencils of light to generate the one or more images representative of the sample, each of the one or more images corresponding to the fluorescence emitted by the sample in response to illumination by a respective one of the plurality of pencils of light; and
combining the one or more images to generate a three dimensional image.

18. The method of claim 14, where the one or more cameras comprises two or more cameras, the method further comprising:
capturing, by a first camera of the two or more cameras, first image data representative of fluorescence emitted by a first portion of the sample in response to illumination by a first one of the plurality of pencils of light; and
capturing, by a second camera of the two or more cameras, second image data representative of fluorescence emitted by a second portion of the sample in response to illumination by a second portion of the sample by a second pencil of light of the plurality of pencils of light, at least a portion of the first image data and the second image data being captured in parallel; and
generating the one or more images based on the image data captured by each of the two or more cameras, a first image of the one or more images being generated based on the first image data captured by the first camera, and a second image of the one or more images being generated based on the second image data captured by the second camera; and combining the first image and the second image to generate a three dimensional image.

\* \* \* \* \*